United States Patent [19]
Narita

[11] Patent Number: 5,363,259
[45] Date of Patent: Nov. 8, 1994

[54] TAPE RECORDER HAVING A COMPACT REVERSE FUNCTION INCLUDING A LIMITER GEAR MECHANISM AND A SWING ARM

[75] Inventor: Hisaya Narita, Tokyo, Japan

[73] Assignee: Sony Corporation, Tokyo, Japan

[21] Appl. No.: 921,249

[22] Filed: Jul. 29, 1992

[30] Foreign Application Priority Data

Aug. 7, 1991 [JP] Japan ................. 3-221265

[51] Int. Cl.5 .................. G11B 5/54; G11B 21/22
[52] U.S. Cl. ................... 360/96.3; 360/74.1; 360/137
[58] Field of Search ........... 360/92, 93, 96.2, 96.3, 360/105, 137, 74.1

[56] References Cited

U.S. PATENT DOCUMENTS

| | | | |
|---|---|---|---|
| 3,684,209 | 8/1992 | Wada | 242/188 |
| 4,305,103 | 12/1981 | Osanai | 360/93 |
| 4,346,415 | 8/1982 | Tomabechi et al. | 360/96.2 |
| 4,504,877 | 3/1985 | Tsuchiya | 360/96.2 |
| 4,551,939 | 4/1985 | Shinohara | 360/93 |
| 4,626,940 | 12/1986 | Kobayashi | 360/96.3 |
| 4,681,281 | 7/1987 | Aarts et al. | 242/200 |
| 4,799,116 | 1/1989 | Ida et al. | 360/96.2 |
| 4,879,613 | 11/1989 | Koizumi et al. | 360/92 |
| 4,896,234 | 1/1990 | Watanabe et al. | 360/105 |
| 4,956,734 | 9/1990 | Kamijo | 360/137 |
| 5,144,507 | 9/1992 | Kurita | 360/96.2 |
| 5,172,283 | 12/1992 | Fukuyama et al. | 360/137 |
| 5,276,567 | 1/1994 | Ohashi et al. | 360/96.2 |

FOREIGN PATENT DOCUMENTS

| | | |
|---|---|---|
| 113324 | 7/1984 | European Pat. Off. . |
| 193243 | 9/1986 | European Pat. Off. . |
| 3226712 | 2/1983 | Germany . |
| 3209872 | 9/1983 | Germany . |
| 3836246 | 4/1990 | Germany . |

Primary Examiner—Stuart S. Levy
Assistant Examiner—Jefferson Evans
Attorney, Agent, or Firm—Jay H. Maioli

[57] ABSTRACT

A tape recorder including a limiter gear mechanism having a torque limiter; a driving device for rotationally driving the limiter gear mechanism in a forward or reverse direction; a swing lever swingably provided between a pair of reel bed gears, and having a gear train adapted to be rotated by the limiter gear mechanism; a magnetic head supporting member for supporting a pair of magnetic heads selectively operable according to a tape travelling direction, one of the magnetic heads between an operative position in contact with a tape and an inoperative position in separation from the tape; a direction lever for selecting the tape travelling direction and controlling movement of the magnetic head supporting member so as to selectively restrict movement of the other magnetic head to the operative position; and a mode lever movable among a neutral position, a record position and a playback position, and biasing the magnetic head supporting member to the operative position of one of the magnetic heads when the mode lever is moved to the record or the playback position; whereby when so biased by the magnetic head supporting member urges a depressed portion of the swing lever to swing the swing lever and mesh the gear train with one of the reel bed gears according to the tape travelling direction.

10 Claims, 35 Drawing Sheets

F I G. 33
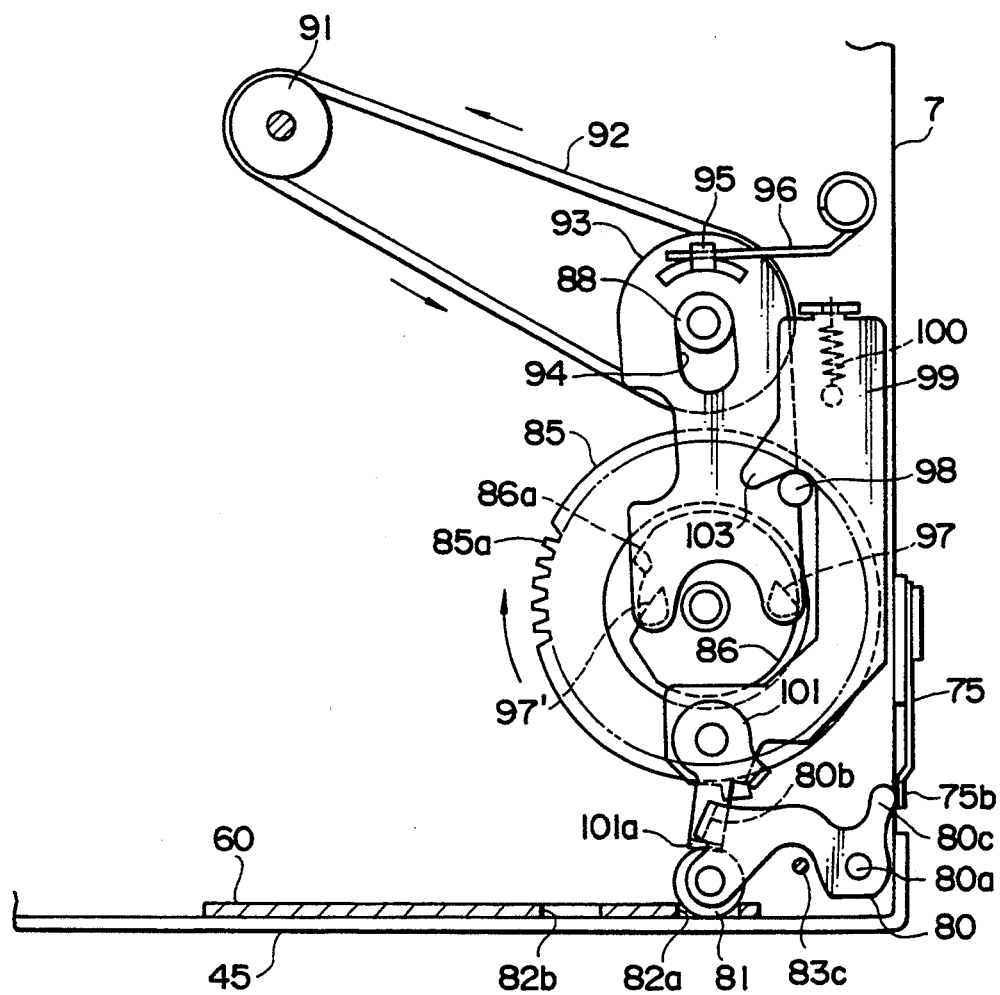

F I G. 34
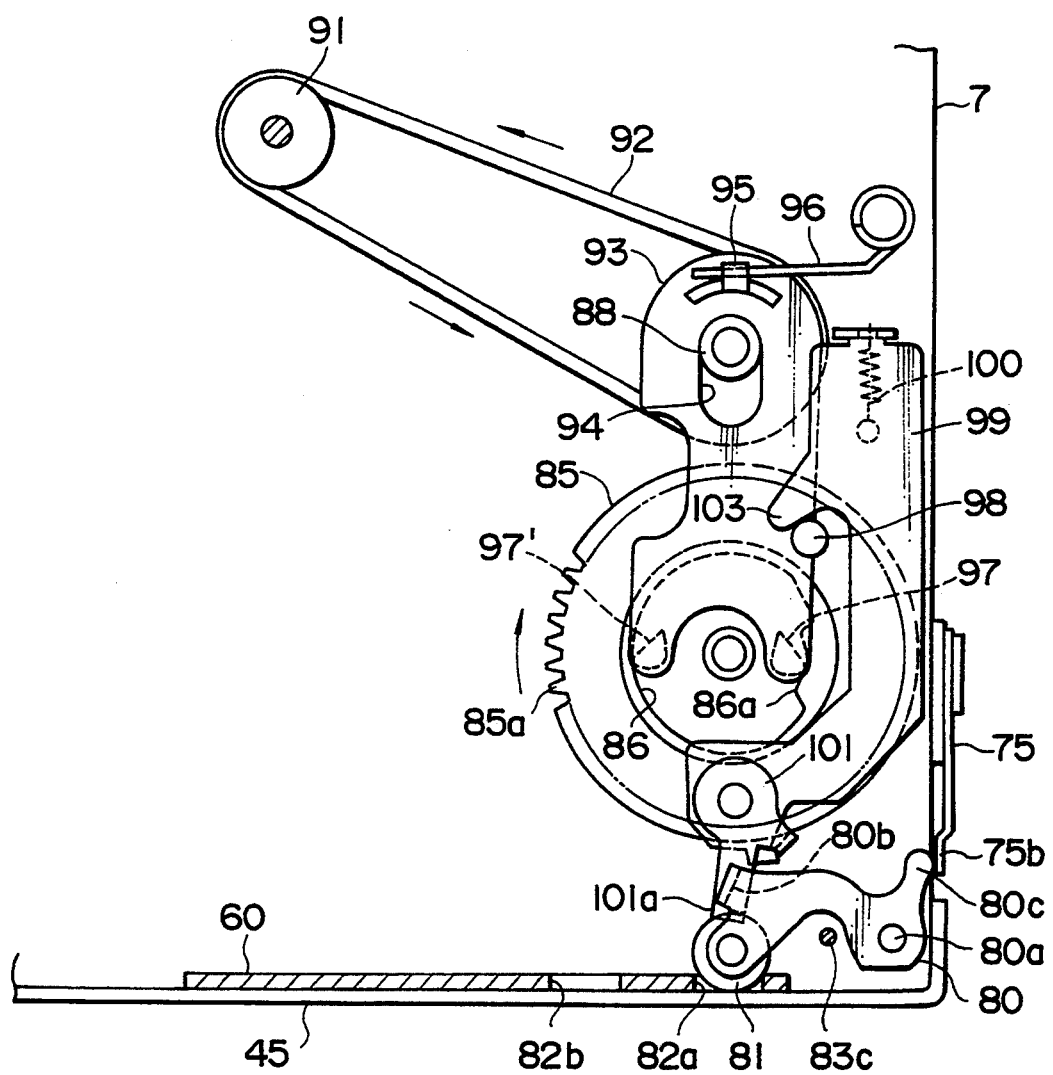

ND A SWING ARM

TAPE RECORDER HAVING A COMPACT REVERSE FUNCTION INCLUDING A LIMITER GEAR MECHANISM AND A SWING ARM

BACKGROUND OF THE INVENTION

The present invention relates to a tape recorder, and more particularly to a tape recorder having a reverse function which can be made compact and simple by reducing a space for installing a mechanism for establishing various modes such as a fast forward/rewind mode, a playback/record mode and an automatic reverse mode, and for installing a driving system for reel bed gears, and can easily adjust azimuth of magnetic heads.

In a tape recorder having a reverse function, a torque limiter which functions by winding a tape is provided with respect to each of two reel beds.

Further, in a conventional tape recorder, two magnetic heads for forward travelling and reverse travelling of the tape are mounted on a single arm. In moving the tape in a forward direction or a reverse direction, the single arm is pivoted to move one of the magnetic heads according to the tape travelling direction to an operative position where the magnetic head is in contact with the tape.

Further, in a conventional tape recorder, rotation of a motor is changed into a reciprocating motion by a cam gear, and a direction lever for selecting a tape travelling direction is moved by the reciprocating motion. Furthermore, a gear mechanism and a plunger for starting the movement of the direction lever by the reciprocating motion are provided, and a tape end detecting mechanism is provided in relation to these mechanisms.

Further, in a conventional tape recorder, a high-speed travelling gear for rotating one of two reel bed gears in mesh therewith at high speeds in establishing a fast forward mode or a rewind mode is provided independently of a gear train for travelling the tape at a constant speed in a playback mode or a record mode.

However, as in the conventional tape recorder wherein the torque limiter is provided with respect to each of the two reel beds, the number of parts increases and a space for installing the parts becomes large, causing trouble in making the tape recorder compact.

Further, as in the conventional tape recorder wherein the two magnetic heads are mounted on the single arm, it appears effective in reducing the number of parts, but it is difficult to completely adjust azimuths of the two magnetic heads. That is, when the azimuth of one of the two magnetic heads is completely adjusted, and thereafter the azimuth of the other magnetic head is adjusted, the azimuth of the magnetic head previously adjusted becomes out of order.

Further, as in the conventional tape recorder, it is necessary to provide, in addition to the cam gear, the gear mechanism and the plunger for starting the movement of the direction lever and also to provide a mechanism for relating these mechanisms to the tape end detecting mechanism. Thus, the whole mechanism becomes greatly large in size and complex in structure.

Further, as in the conventional tape recorder, the high-speed travelling gear is provided independently of the constant-speed travelling gear train. Accordingly, it is difficult to make the structure simple and compact.

SUMMARY OF THE INVENTION

It is accordingly a first object of the present invention to provide a tape recorder which employs a single limiter gear having a torque limiter to thereby reduce the number of parts for driving the reel beds and reduce a space for installing a mechanism.

It is a second object of the present invention to provide a tape recorder which employs two head arms for respectively mounting the two magnetic heads for forward travelling and reverse travelling of the magnetic tape, thereby enabling the azimuths of the two magnetic heads to be independently adjusted with a simple operation.

It is a third object of the present invention to provide a tape recorder which employs resilient means for normally biasing the direction lever to a reverse position where a reverse mode is established, thereby changing a tape travelling direction only by unlocking the direction lever in a forward position where a forward mode is established, at the tape end in the forward mode.

It is a fourth object of the present invention to provide a tape recorder which employs an intermediate gear adapted to mesh one of the two reel bed gears in the fast forward mode or the rewind mode and also adapted to be associated with the constant-speed travelling gear train through the torque limiter, thereby simplifying driving force transmitting mechanisms for the high-speed travelling and the constant-speed travelling.

According to a first aspect of the present invention, there is provided a tape recorder comprising a limiter gear mechanism having a torque limiter; driving means for rotationally driving said limiter gear mechanism in a forward or reverse direction; a swing lever swingably provided between a pair of reel bed gears, said swing lever having a gear train adapted to be normally rotated by said limiter gear mechanism and also having a depressed portion; a magnetic head supporting member for supporting a pair of magnetic heads adapted to be selectively operated according to a tape travelling direction, said magnetic head supporting member being movable so as to selectively move one of said magnetic heads between an operative position where said one of said magnetic heads is in contact with a tape and an inoperative position where said one of said magnetic heads is in separation from said tape; direction selecting means for selecting said tape travelling direction and controlling movement of said magnetic head supporting member so as to selectively restrict movement of the other magnetic head to said operative position; and a mode lever adapted to be moved among a neutral position, a record position and a playback position, said mode lever biasing said magnetic head supporting member to said operative position of said one of said magnetic heads when said mode lever is moved to said record position or said playback position; whereby when said magnetic head supporting member is biased by said mode lever to move said one of said magnetic heads to said operative position according to said tape travelling direction selected by said direction selecting means, said magnetic head supporting member urges said depressed portion of said swing lever to swing said swing lever and bring said gear train into mesh with one of said reel bed gears according to said tape travelling direction.

According to a second aspect of the present invention, there is provided a tape recorder comprising a pair of head arms respectively having a pair of magnetic heads for forward constant-speed travelling and reverse constant-speed travelling, each of said head arms being movable between an operative position where the corresponding magnetic head is in contact with a tape and an inoperative position where the corresponding magnetic head is in separation from said tape; a direction lever adapted to be moved among a neutral position, a forward position and a reverse position, said direction lever hindering movement of one of said head arms to said operative position when said direction lever is in said forward position, and hindering movement of the other head arm to said operative position when said direction lever is in said reverse position; and a mode lever adapted to be moved among a neutral position, a record position and a playback position, said mode lever biasing one of said head arms to said operative position when said mode lever is in said record position or said playback position; whereby when said mode lever is moved to said record position or said playback position under the condition where said direction lever is in said forward position or said reverse position, one of said head arms is selectively moved to said operative position.

According to a third aspect of the present invention, there is provided a tape recorder comprising a direction lever adapted to be slid between a first position where a forward mode is established and a second position where a reverse mode is established, in which a tape travels in a direction reverse to a travelling direction of said tape in said forward mode; resilient means for resiliently biasing said direction lever to said second position; direction lever locking means for locking said direction lever in said first position; and tape end detecting means for unlocking said direction lever locked by said direction lever locking means at the end of said tape in said forward mode.

According to a fourth aspect of the present invention, there is provided a tape recorder comprising a pair of take-up and supply reel bed gears; a play gear adapted to selectively mesh one of said take-up and supply reel bed gears; a limiter gear associated with said play gear; an intermediate gear arranged coaxially with said limiter gear and adapted to be rotated by a driving source; a torque limiter interposed between said limiter gear and said intermediate gear; and a high-speed mode select slider for supporting said intermediate gear, said high-speed mode select slider being slidable among a neutral position where said intermediate gear meshes neither said take-up reel bed gear nor said supply reel bed gear, a fast forward position where said intermediate gear meshes said take-up reel bed gear, and a rewind position where said intermediate gear meshes said supply reel bed gear; whereby when said high-speed mode select slider is slid to said fast forward position or said rewind position, said intermediate gear is selectively brought into mesh with one of said take-up reel bed gear or said supply reel bed gear.

In the tape recorder of the present invention, as the limiter gear having the torque limiter is singly provided, the number of parts can be reduced, and a space for installing the mechanism for driving the reel beds can be made small.

In the tape recorder of the present invention, as the two magnetic heads are respectively mounted on the two head arms, the adjustment of azimuths of the two magnetic heads can be independently carried out with a simple operation.

In the tape recorder of the present invention, as the direction lever is normally biased by the resilient means, the direction lever can be moved by a resilient force of the resilient means to the reverse position where the reverse mode is established, only by unlocking the direction lever in the forward position where the forward mode is established at the tape end in the forward mode. Accordingly, a structure for changing a tape travelling direction can be made simple and compact.

In the tape recorder of the present invention, as the intermediate gear adapted to mesh one of the reel bed gears in the fast forward mode or the rewind mode serves to transmit rotation of a driving source through the torque limiter to the constant-speed travelling gear train, it is unnecessary to specially provide a high-speed travelling gear. Accordingly, a mechanism for transmitting a driving force to the reel bed gears can be simplified in structure, and the tape recorder can be made compact as a whole.

Other objects and features of the invention will be more fully understood from the following detailed description and appended claims when taken with the accompanying drawings.

BRIEF DESCRIPTION OF THE DRAWINGS

FIG. 33 is a plan view illustrating a condition of the tape end detecting mechanism in a reverse playback condition:

FIG. 34 is a plan view similar to FIG. 33, illustrating another condition of the tape end detecting mechanism;

DETAILED DESCRIPTION OF THE PREFERRED EMBODIMENTS

Figure 1:
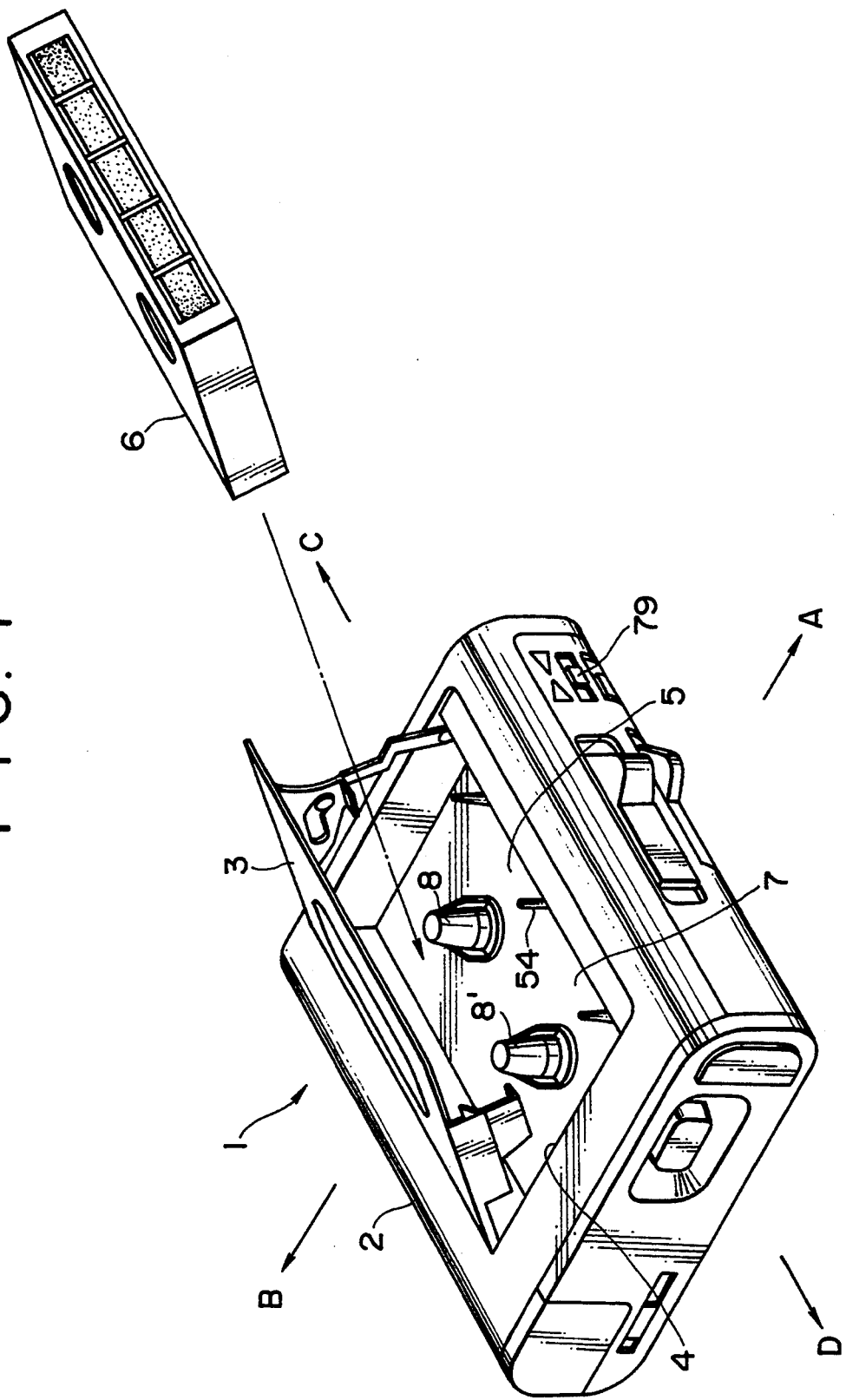
FIG. 1 is a perspective view of a tape recorder according to the present invention under the condition where a cassette lid is opened to show an open condition of a cassette loading portion of the tape recorder.

A preferred embodiment of the tape recorder according to the present invention will now be described with reference to the accompanying drawings.

Reference numeral 1 generally designates a tape recorder according to the present invention. The tape recorder has a housing 2 and a lid 3 for openably closing a cassette insert opening 4 formed on an upper surface of the housing 2. In an open condition of the lid 3 as shown in FIG. 1, a cassette loading recess 5 formed in the housing 2 is opened through the cassette insert opening 4 to the outside of the housing 2, so that a tape cassette 6 can be loaded into the cassette loading recess 5 and unloaded therefrom.

Reference numeral 7 designates a chassis mounted in the housing 2. The cassette loading recess 5 is defined by an upper surface of the chassis 7 and an inner surface of the housing 2.

Figure 7:
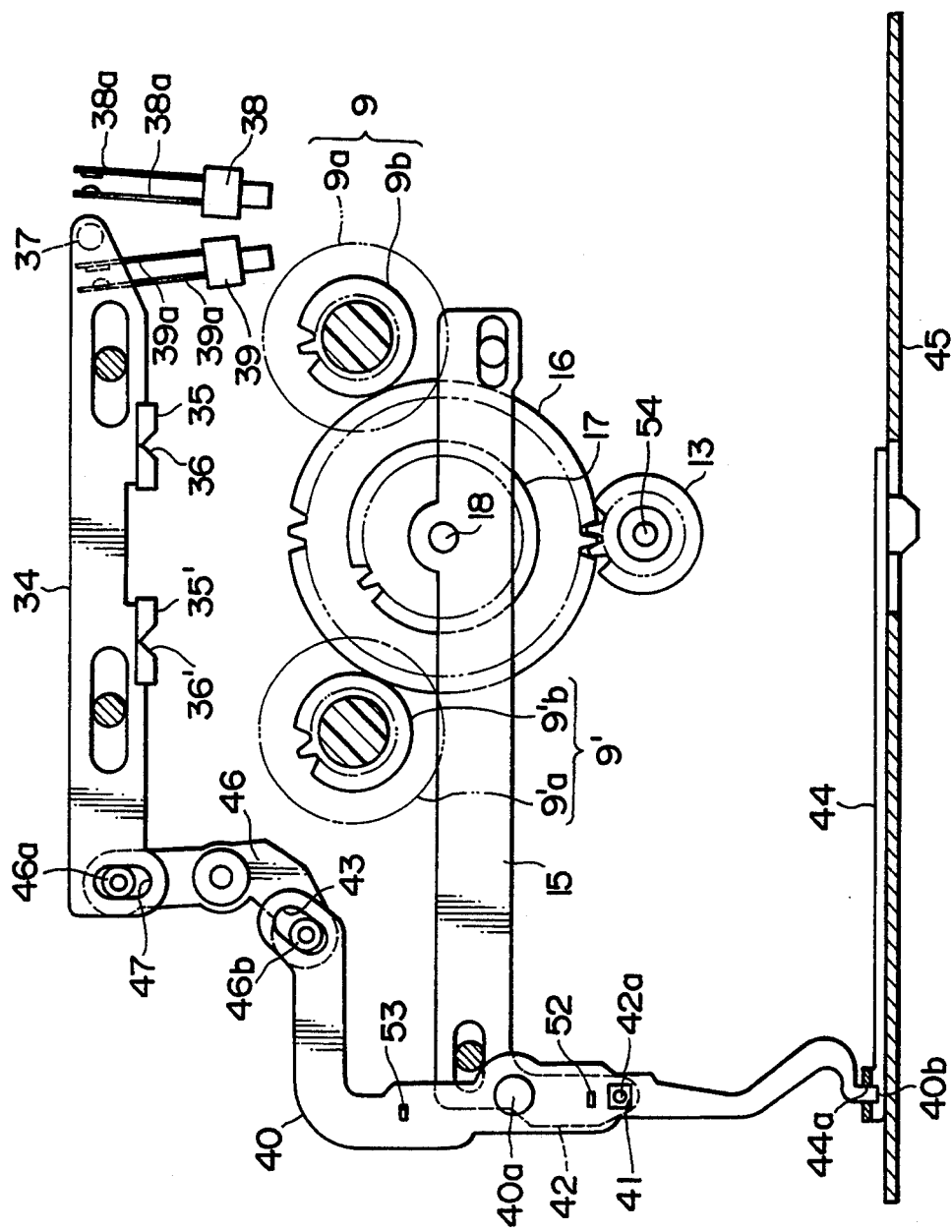
FIG. 7 is a plan view illustrating a neutral condition of a mechanism for establishing a high-speed travelling mode.

Two reel beds 8 and 8' are provided in the cassette loading recess 5 so as to be rotatably supported to the chassis 7 and be spaced apart from each other in a lateral direction (as depicted by arrows C and D in FIG. 1). Two reel bed gears 9 and 9' respectively integral with the reel beds 8 and 8' as shown in FIG. 7, are located under the chassis 7. The reel bed gear 9 is composed of a large gear 9a and a small gear 9b integral with each other. Similarly, the reel bed gear 9' is composed of a large gear 9'a and a small gear 9'b integral with each other.

Figure 2:
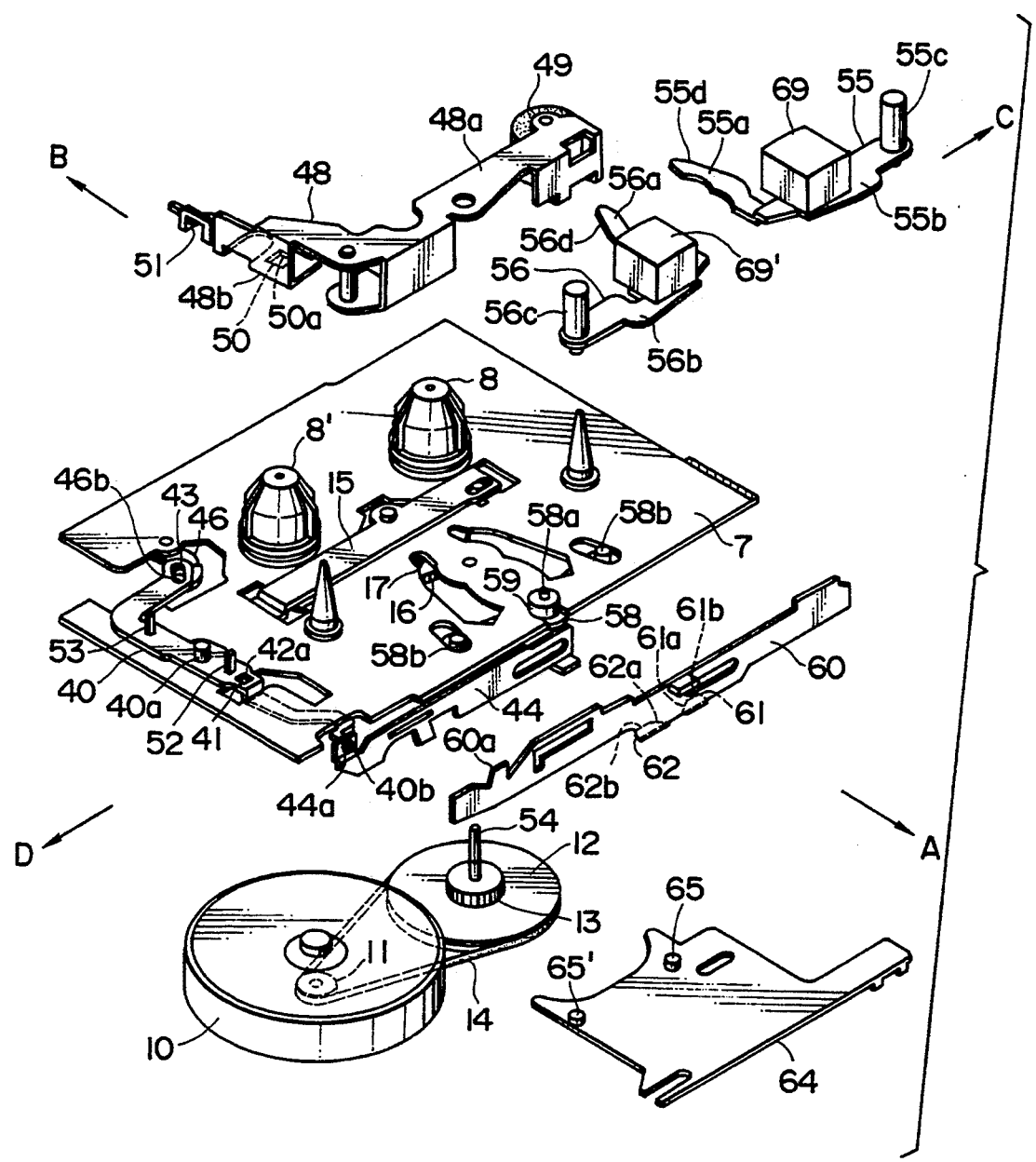
FIG. 2 is an exploded perspective view of a mechanism portion of the tape recorder as a whole.

Reference numeral 10 designates a motor fixed under the chassis 7 at a left position thereof (on the side depicted by arrow D in FIG. 2). A pulley 11 is fixed to a rotating shaft 10a of the motor 10.

Reference numeral 12 designates a pulley rotatably supported under the chassis 7 at a substantially central position on the front side thereof (on the side depicted by arrow A in FIG. 2). A small driving gear 13 is integrally formed on an upper surface of the pulley 12 at a central portion thereof. An endless belt 14 is wrapped between the pulley 12 and the pulley 11 fixed to the rotating shaft 10a of the motor 10. Accordingly, when the motor 10 is rotated, the pulley 12 is rotated in the same direction.

Reference numeral 15 designates a fast forward-/rewind mode select slider (which will be hereinafter referred to as FR slider) elongated in the lateral direction. The FR slider 15 is supported on the chassis 7 such that it is slidable in a lateral direction at a central portion thereof with respect to a transverse direction (as depicted by arrow A and B in FIG. 2).

Figure 3:
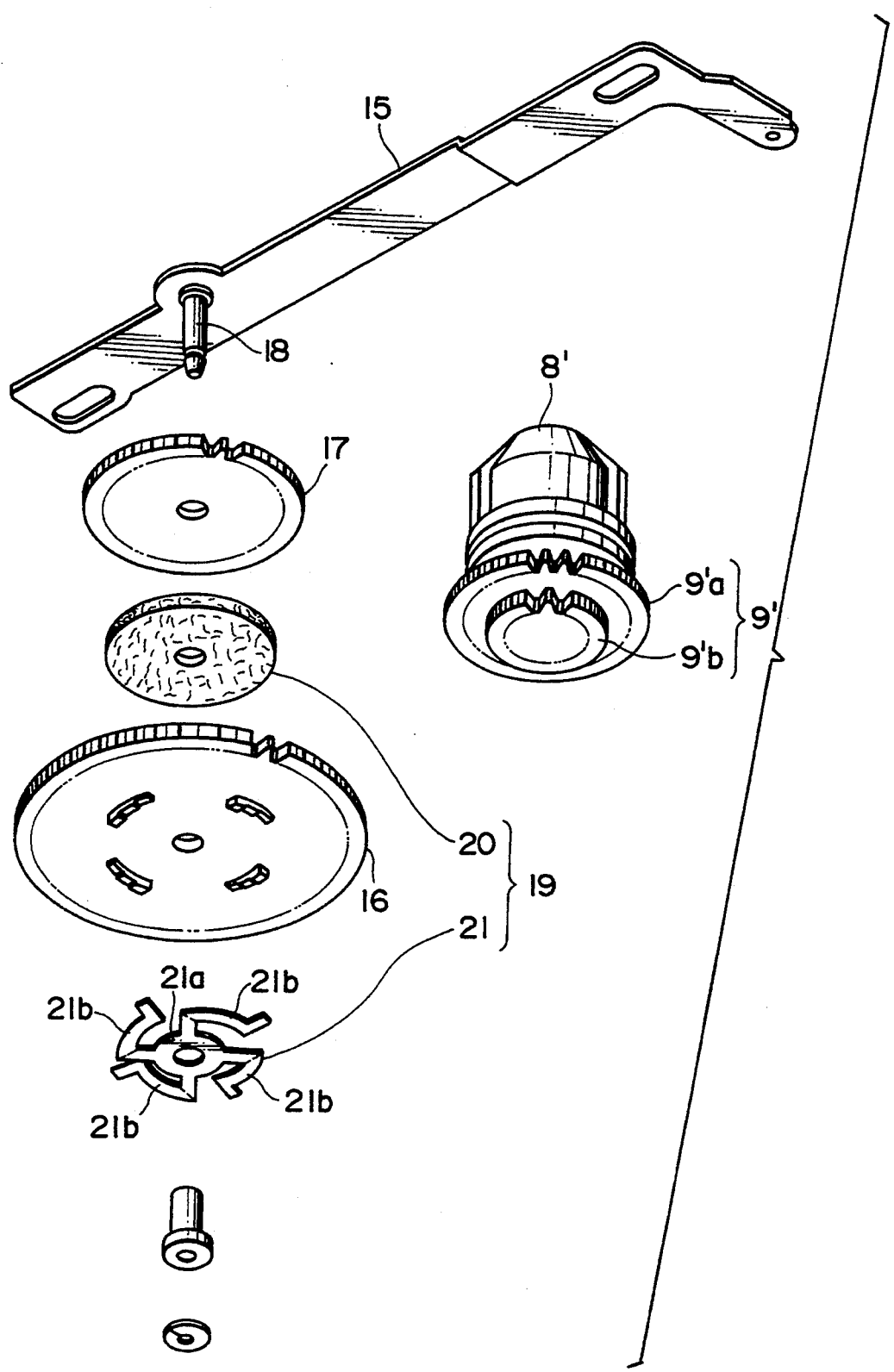
FIG. 3 is an exploded perspective view illustrating a fast forward/rewind mode select slider, an intermediate gear and a limiter gear with a peripheral portion thereof.

As shown in FIG. 3, reference numeral 16 designates an intermediate gear rotatably supported on a support shaft 18 vertically extending under the FR slider 15. The intermediate gear 16 normally meshes the driving gear 13.

Reference numeral 17 designates a limiter gear rotatably supported on the support shaft 18 over the intermediate gear 16.

A torque limiter 19 is interposed between the intermediate gear 16 and the limiter gear 17. The torque limiter 19 is composed of a friction disk 20 formed of a material having a large coefficient of friction, such as a felt, and a presser spring 21 for pressing the intermediate gear 16 against the limiter gear 17 through the friction disk 20.

The presser spring 21 is formed of a leaf spring material, and it is constituted of a central disk 21a and a plurality of L-shaped arms 21b projecting from an outer circumference of the central disk 21a and then extending in a circumferential direction. A free end of each arm 21b is slightly bent upwardly. The central disk 21a of the presser spring 21 is centrally mounted on the support shaft 18 at a lower end thereof, and the free ends of the arms 21b of the presser spring 21 resiliently urge a lower surface of the intermediate gear 16. Thus, the intermediate gear 16 is normally biased upwardly by the presser spring 21 and is pressed against the limiter gear 17 through the friction disk 20.

Accordingly, when the intermediate gear 16 is rotated, the limiter gear 17 is also rotated together with the intermediate gear 16. However, when a large load is applied to the limiter gear 17, slip occurs between the friction disk 20 and the limiter gear 17.

When the FR slider 15 is moved to the left, the intermediate gear 16 is also moved to the left together with the FR slider 15 to come into mesh with the small gear 9'b of the take-up side reel bed gear 9' (which will be hereinafter referred to as T-side reel bed gear 9') of the take-up side reel bed 8' (which will be hereinafter referred to as T-side reel bed 8') and rotate the T-side reel bed 8' in a tape winding direction at high speeds. In contrast, when the FR slider 15 is moved to the right in FIG. 2, the intermediate gear 16 also moved to the right together with the FR slider 15 to come into mesh with the small gear 9b of the supply side reel bed gear 9 (which will be hereinafter referred to as S-side bed gear 9) of the supply side reel bed 8 (which will be hereinafter referred to as S-side reel bed 8) and rotate the S-side reel bed 8 in a tape winding direction at high speeds.

Figure 4:
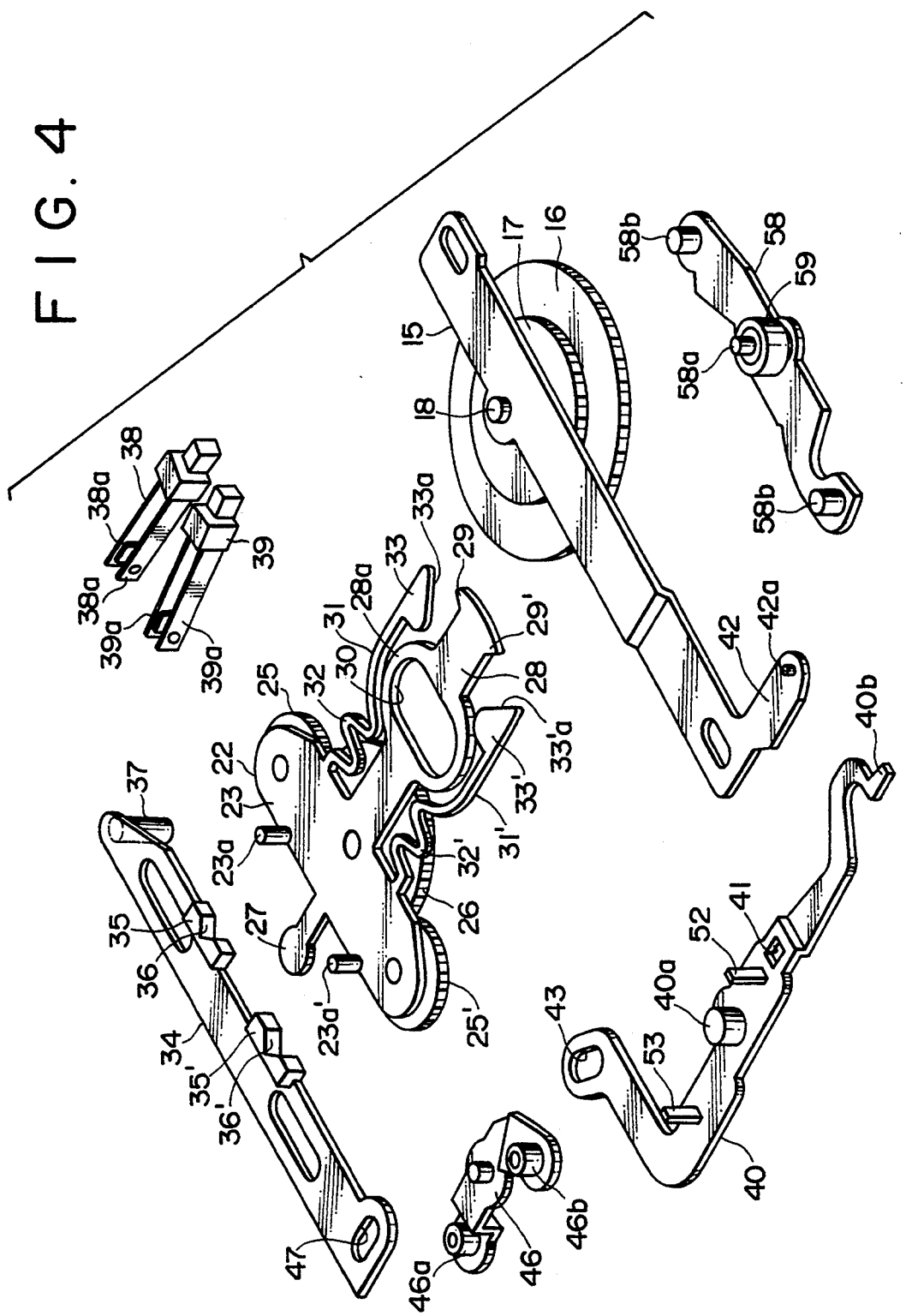
FIG. 4 is an exploded perspective view illustrating play gears, the intermediate gear and other peripheral members associated therewith.

As shown in FIG. 4, reference numeral 22 designates a take-up arm pivotably supported under the chassis 7 on the rear side at a substantially central position thereof with respect to a lateral direction. The take-up arm 22 is formed of a leaf spring material.

Figure 5:
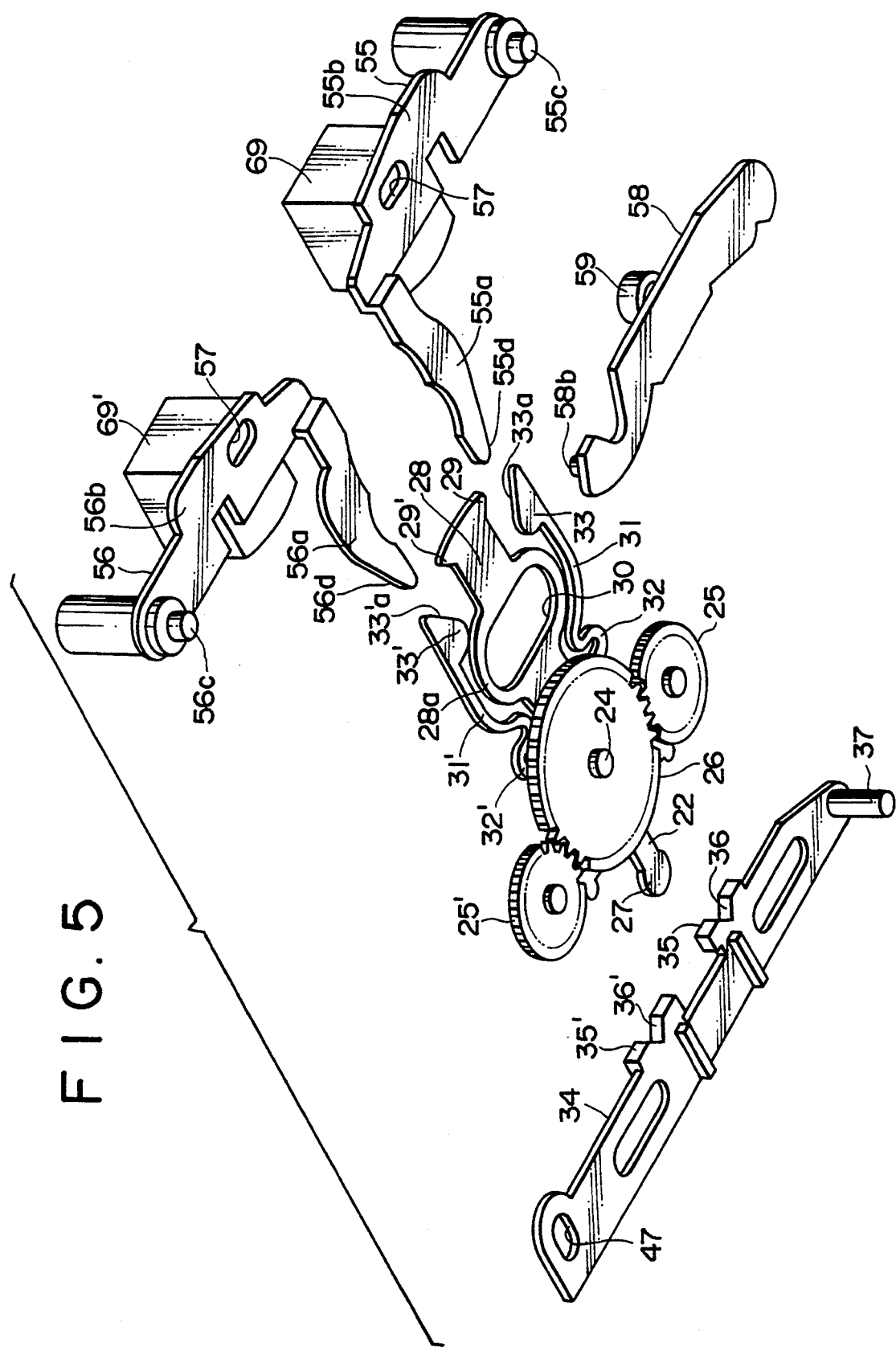
FIG. 5 is an exploded perspective view illustrating the play gears and other peripheral members associated therewith.
Figure 6:
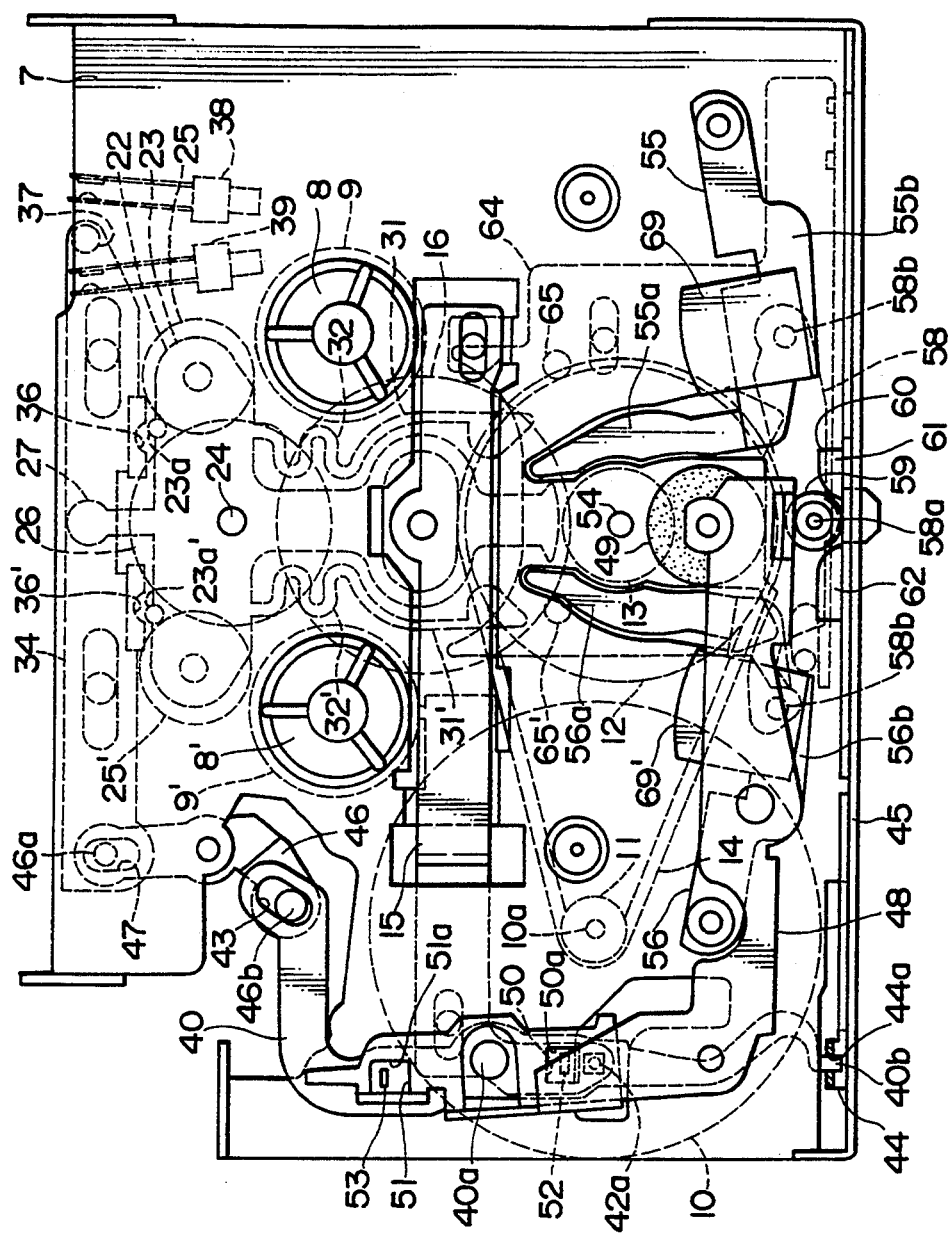
FIG. 6 is a plan view of the mechanism portion.

The take-up arm 22 has a plate-like gear supporting portion 23 elongated in the lateral direction. The gear supporting portion 23 is pivotably supported at a laterally central position thereof on the front side to a support shaft 24 extending vertically downwardly from the chassis 7, as depicted in FIG. 5. Two play gears 25 and 25' are rotatably supported under the gear supporting portion 23 at right and left end portions thereof, respectively.

Two small projections 23a and 23'a are formed on the upper surface of the gear supporting portion 23 on the rear side at laterally spaced positions thereof.

Reference numeral 26 designates a relay gear rotatably supported to the support shaft 24 under the take-up arm 22. The relay gear 26 normally meshes the limiter gear 17 and the play gears 25 and 25'.

A restricted portion 27 projects rearward from a rear edge of the gear supporting portion 23 at a laterally central position thereof.

A restricting portion 28 projects frontward from a front edge of the gear supporting portion 23 at a laterally central position thereof. Two projections 29 and 29' are formed at a front end of the restricting portion 28 so as to project rightward and leftward, respectively.

A generally transversely central portion of the restricting portion 28 is formed as an oval portion 28a. The oval portion 28a is formed with an oval through hole 30 elongated laterally. The support shaft 18 supporting the intermediate gear 16 and the limiter gear 17 is inserted through the oval through hole 30, so that lateral slide of the FR slider 15 and pivotal movement of the take-up arm 22 are permitted.

Two depressed arms 31 and 31' project frontward from the front edge of the gear supporting portion 23 at right and left positions spaced from a rear end of the restricting portion 28. The depressed arms 31 and 31' extend generally along the restricting portion 28 and terminate at positions just behind the front end of the restricting portion 28.

Rear end portions of the depressed arms 31 and 31' are formed as S-shaped spring portions 32 and 32', respectively. The remaining portions of the depressed arms 31 and 31' other than the S-shaped spring portions 32 and 32' extend frontward along the right and left side edges of the oval portion 28a with a fixed space, respectively. Front end portions 33 and 33' of the depressed arms 31 and 31' are formed with angled inside edges 33a and 33'a opposed to the right and left side edges of the front end portion of the restricting portion 28 so that distant between the front end portions 33 and 33' of the depressed arms 31 and 31' and the restricting portion 28 increases as they extend frontward.

Reference numeral 34 designates a restricting slider laterally supported under the chassis 7 along the rear end thereof such that it is slidable. Two depressing portions 35 and 35' project from a front edge of the restricting slider 34 at right and left positions spaced laterally, respectively. The depressing portions 35 and 35' are formed at their front central positions with V-shaped recesses 36 and 36', respectively.

In a central position of a movable range of the restricting slider 34, that is, in a neutral position of the restricting slider 34, when the take-up arm 22 is pivoted, the projection 23a or 23'a is brought into engagement with the recess 36 or 36' of the depressing portion 35 or 35' of the restricting slider 34. Accordingly, the take-up arm 22 is allowed to be pivoted until the play gear 25 or 25' meshes with the large gear 9a or 9'a of the reel bed 8 or 8'.

In such a condition that the take-up arm 22 is pivoted to bring the play gear 25 or 25' into mesh with the large gear 9a or 9'a of the reel bed 8 or 8', a play mode for carrying out record or playback is established. In the play mode, a magnetic tape (not shown) travels at a constant speed, and is wound up on a tape reel (not shown) engaged with the T-side reel bed 8' (in a normal play mode) or on another tape reel (not shown) engaged with the S-side reel bed 8 (in a reverse play mode).

In moving the magnetic tape at high speeds to establish a cue/review condition or a fast forward/rewind condition, the restricting slider 34 is moved from the neutral position to the left (in the cue condition or the fast forward condition) or to the right (in the review condition or the rewind condition). In particular, when the restricting slider 34 is moved in a playback condition to establish the cue/review condition, a front surface of the depressing portion 35 or 35' of the restricting slider 34 adjacent to the recess 36 or 36' depresses the projection 23a or 23'a of the take-up arm 22 in which the play gear 25 or 25' meshes the large gear 9a or 9'a of the reel bed 8 or 8', and pivots the take-up arm 22 to separate the play gear 25 or 25' from the large gear 9a or 9'a.

More specifically, when the FR slider 15 is moved to the left in the playback condition, the restricting slider 34 is moved from the neutral position to the left by an interlocking mechanism which will be hereinafter described. Accordingly, the take-up arm 22 is pivoted to bring the play gear 25 or 25' into separation from the large gear 9a or 9'a of the reel bed 8 or 8'. Further, the intermediate gear 16 is brought into mesh with the small gear 9'b of the T-side reel bed 8' by the leftward movement of the FR slider 15. Accordingly, the T-side reel bed 8' is rotated at high speeds in a tape winding direction. In this way, the cue condition is established.

In contrast, when the FR slider 15 is moved to the right in the playback condition, the restricting slider 34 is moved from the neutral position to the right by the interlocking mechanism. Accordingly, the take-up arm 22 is pivoted to bring the play gear 25 or 25' into separation from the large gear 9a or 9'a of the reel bed 8 or 8'. Further, the intermediate gear 16 is brought into mesh with the small gear 9b of the S-side reel bed 8 by the rightward movement of the FR slider 15. Accordingly, the S-side reel bed 8 is rotated at high speeds in a tape winding direction. In this way, the review condition is established.

A switch operating pin 37 projects downwardly from a lower surface of the restricting slider 34 at a right end thereof.

Reference numerals 38 and 39 designate two leaf switches for changing a rotational direction of the motor 10. The leaf switches 38 and 39 are fixed to the lower surface of the chassis 7. The leaf switches 38 and 39 have two contact arms 38a and two contact arms 39a, respectively. Free ends of the contact arms 38a and 39a are located on a locus of movement of the switch operating pin 37. That is, in the neutral position of the restricting slider 34, the free ends of the contact arms 38a are located on the right side of the switch operating pin 37 in spaced relationship therefrom, and the free ends of the contact arms 39a are located on the left side of the switch operating pin 37 in spaced relationship therefrom, as depicted in FIG. 7.

Figure 8:
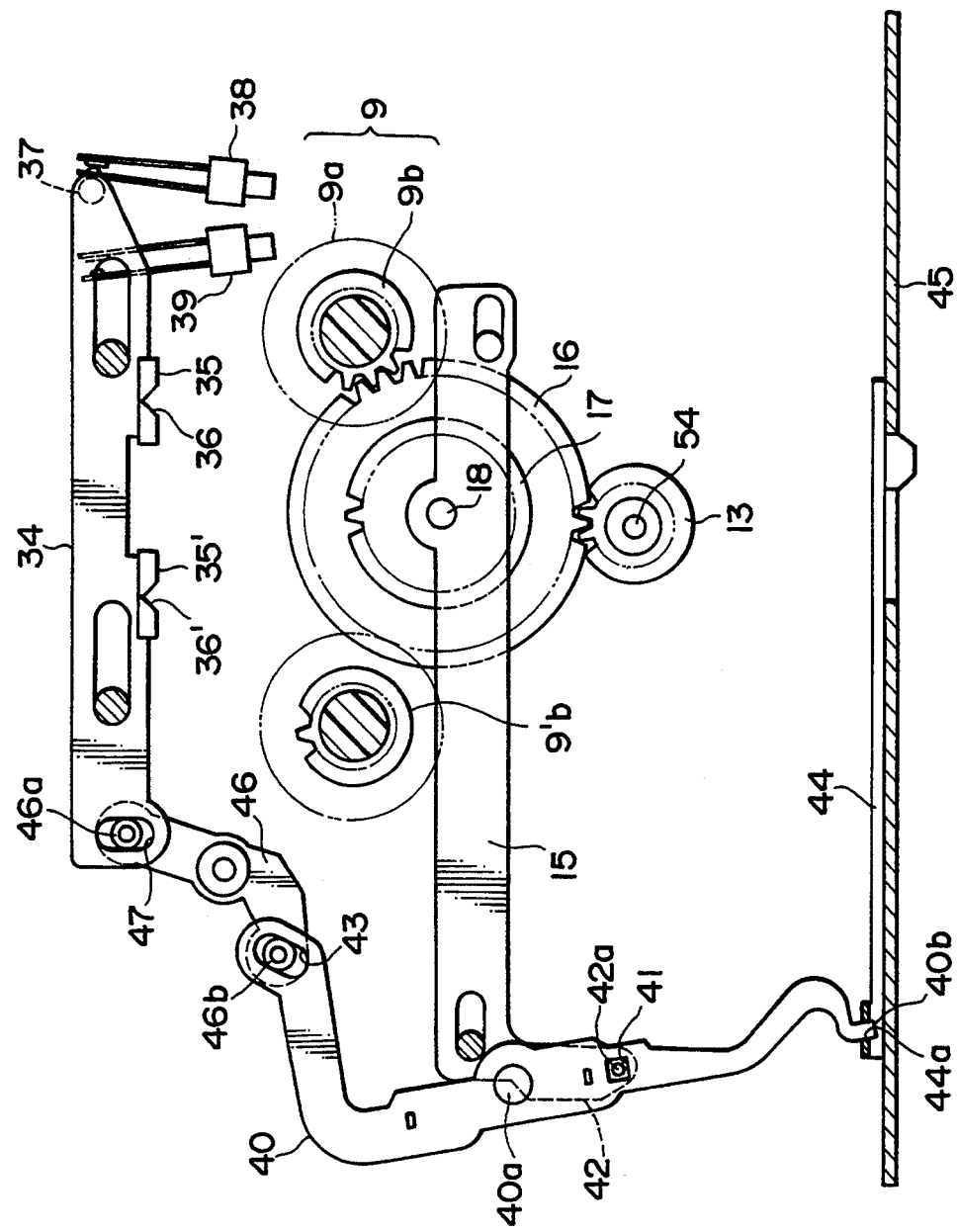
FIG. 8 is a plan view similar to FIG. 7, illustrating a rewind condition.
Figure 9:
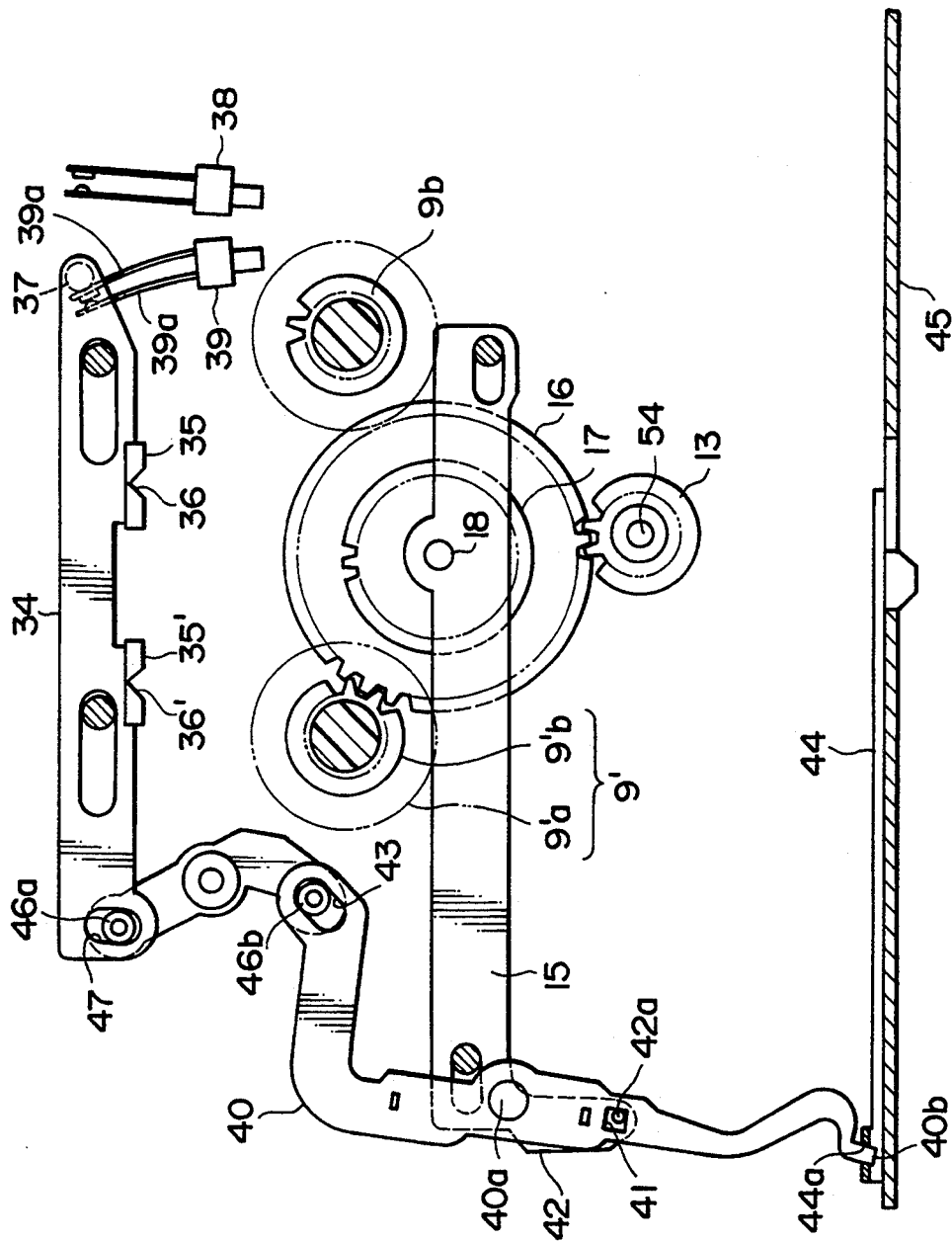
FIG. 9 is a plan view similar to FIG. 7, illustrating a fast forward condition.

Accordingly, when the restricting slider 34 is moved to the left, the switch operating pin 37 pushes the free ends of the contact arms 39a of the left leaf switch 39 to bring them into contact with each other, as depicted in FIG. 9, thereby rotating the motor 10 in a direction corresponding to the tape winding direction of the T-side reel bed 8'. In contrast, when the restricting slider 34 is moved to the right, the switch operating pin 37 pushes the free ends of the contact arms 38a of the right leaf switch 38 to bring them into contact with each other, as depicted in FIG. 8, thereby rotating the motor 10 in a direction corresponding to the tape winding direction of the S-side reel bed 8.

Reference numeral 40 designates a substantially L-shaped interlocking arm pivotably supported at a substantially transversely central position thereof on a left end portion of the chassis 7. A rectangular joint hole 41 is formed through the interlocking arm 40 at a position in front of a pivot 40a of the interlocking arm 40. The FR slider 15 is formed at its left end with a projection 42 projecting frontward, and a joint pin 42a is formed to project upwardly from an upper surface of the projection 42 at a front end portion thereof. The joint pin 42a of the FR slider 15 is slidably engaged with the joint hole 41 of the interlocking arm 40.

Further, a joint hole 43 elongated obliquely is formed through the interlocking arm 40 at a rear end portion thereof.

Reference numeral 44 designates a fast forward-/rewind mode select lever (which will be hereinafter referred to as FR lever) laterally supported on a front plate 45 provided on the front edge of the chassis 7 so that is it slidable. A joint hole 44a is formed through the FR lever 44 at a left end portion thereof. A front end 40b of the interlocking arm 40 is swingably engaged with the joint hole 44a of the FR lever 44.

Accordingly, when the FR lever 44 is slid in the lateral direction, the interlocking arm 40 is pivoted about the pivot 40a owing to the engagement of the front end 40b with the joint hole 44a of the FR lever 44. As a result, the FR slider 15 engaged with the interlocking arm 40 is moved laterally by the pivotal movement of the interlocking arm 40.

More specifically, when the FR lever 44 is moved to the left, the interlocking arm 40 is pivoted in a clockwise direction as viewed in top plan to leftward displace the joint hole 41 engaged with the joint pin 42a of the FR slider 15. Accordingly, the FR slider 15 is moved to the left. In contrast, when the FR lever 44 is moved to the right, the interlocking arm 40 is pivoted in a counterclockwise direction as viewed in top plan to rightward displace the joint hole 41 engaged with the joint pin 42a of the FR slider 15. Accordingly, the FR slider 15 is moved to the right.

Reference numeral 46 designates a link pivotably supported at an intermediate portion thereof on the chassis 7 at the rear left portion thereof. Joint pins 46a and 46b are formed to project upwardly from an upper surface of the link 46 at rear and front ends thereof, respectively.

The front joint pin 46b of the link 46 is slidably engaged with the joint hole 43 of the interlocking arm 40, and the rear joint pin 46a of the link 46 is slidably engaged with a transversely elongated joint hole 47 formed through the restricting slider 34 at the left end portion thereof.

Accordingly, when the FR lever 44 is slid laterally, the interlocking arm 40 is pivoted, and the restricting slider 34 is slid laterally through the link 46.

Further, when the FR lever 44 is moved from a stop mode to the left or the right, a fast forward mode or a rewind mode is established.

That is, as mentioned previously, when the FR lever 44 is moved to the left, the FR slider 15 is moved to the left through the interlocking arm 40 to bring the intermediate gear 16 into mesh with the small gear 9'b of the T-side reel bed 8'. At the same time, the restricting slider 34 is moved to the left through the interlocking arm 40 and the link 46 to thereby bring the contact arms 39a of the left leaf switch 39 into contact with each other through the pin operating switch 37. As a result, the motor 10 is rotated in such a direction as so rotate the T-side reel bed 8' in the tape winding direction. Thus, the fast forward mode is established.

In contrast, when the FR lever 44 is moved to the right, the FR slider 15 is moved to the right through the interlocking arm 40 to bring the intermediate gear 16 into mesh with the small gear 9b of the S-side reel bed 8. At the same time, the restricting slider 34 is moved to the right through the interlocking arm 40 and the link 46 to thereby bring the contact arms 38a of the right leaf switch 38 into contact with each other through the switch operating pin 37. As a result, the motor 10 is rotated in such a direction as to rotate the S-side reel bed 8 in the tape winding direction. Thus, the rewind mode is established.

Reference numeral 48 designates a substantially L-shaped pinch roller lever pivotably supported at a bent portion thereof on the upper surface of the chassis 7 at a left front position thereof. The pinch roller lever 48 is generally composed of a front arm 48a extending laterally and a left arm 48b extending transversely. A pinch roller 49 is rotatably supported on the front arm 48a at a right end portion thereof.

Further, two rectangular joint holes 50 and 51 are formed through the left arm 48b of the pinch roller lever 48 at a rear half portion thereof so as to be transversely spaced from each other. Right edges 50a and 51a of the joint holes 50 and 51, respectively, are formed as depressed edges.

Two projections 52 and 53 are formed on the upper surface of the interlocking arm 40 at front and rear positions spaced from each other on the opposite sides of the pivot 40a. The front projection 52 is displaceably received in the front joint hole 50 of the pinch roller lever 48, and the rear projection 53 is displaceably received in the rear joint hole 51 of the pinch roller lever 48.

Reference numeral 54 designates a capstan fixed at a lower end portion thereof to the pulley 12 and the driving gear 13. Most of the capstan 54 projects upwardly from the upper surface of the chassis 7.

When the interlocking arm 40 is pivoted in the counterclockwise direction, the front projection 52 of the interlocking arm 40 pushes the depressed edge 50a of the front joint hole 50 of the pinch roller lever 48 rightward. Accordingly, the pinch roller lever 48 is slightly pivoted in the clockwise direction to thereby bring the pinch roller 49 into separation from the capstan 54. At this time, the rear projection 53 of the interlocking arm 40 is moved leftward in the rear joint hole 51 of the pinch roller lever 48. Since this leftward movement of the rear projection 53 is effected in the rear joint hole 51, the clockwise pivotal movement of the pinch roller lever 48 is not hindered.

In contrast, when the interlocking arm 40 is pivoted in the clockwise direction, the rear projection 53 of the interlocking arm 40 pushes the depressed edge 51a of the rear joint hole 51 of the pinch roller lever 48 rightward. Accordingly, the pinch roller lever 48 is slightly pivoted in the clockwise direction to thereby bring the pinch roller 49 into separation from the capstan 54. At this time, the front projection 52 is moved leftward in the front joint hole 50 of the pinch roller lever 48. Since this leftward movement of the front projection 52 is effected in the front joint hole 50, the clockwise pivotal movement of the pinch roller lever 48 is not hindered.

Accordingly, when the FR lever 44 is operated in the play mode to establish the cue condition or the review condition, the pinch roller 49 is separated from the capstan 54 to enable the magnetic tape to travel at high speeds.

Reference numerals 55 and 56 designate right and left L-shaped head levers pivotably supported at pivots 55c and 56c an the upper surface of the chassis 7, respectively. The head levers 55 and 56 respectively have control portions 55a and 56a extending in the transverse direction at a laterally central position of the chassis 7 on the front half side thereof so as to be opposed to each other, and also respectively have front arms 55b and 56b extending in the lateral direction from the front ends of the control portions 55a and 56a. The pivots 55c and 56c are located at the right end of the front arm 55b of the right head lever 55 and at the left end of the front arm 56b of the left head lever 56, respectively. Two laterally elongated joint holes 57 are formed through the front arms 55b and 56b at left and right portions thereof, respectively.

Reference numeral 58 designates a seesaw lever pivotably supported at a laterally central position thereof on a laterally central portion of the chassis 7 at the front end thereof such that it is transversely movable. A support shaft 58a projects upwardly from an upper surface of the seesaw lever 58 at the laterally central portion thereof, and a roller 59 is rotatably supported on the support shaft 58a. Further, two joint pins 58b project upwardly from the upper surface of the seesaw lever 58 at the right and left end portions thereof.

The joint pins 58b of the seesaw lever 58 are slidably engaged with the joint holes 57 of the head levers 55 and 56, respectively.

Reference numeral 60 designates a mode lever for selecting a playback mode or a record mode. The mode lever 60 is supported on the front plate 45 of the chassis 7 such that it is slidable in a lateral direction. Two cams 61 and 62 are formed to project rearward from a rear surface of the mode lever 60 at a laterally central portion thereof so as to be laterally slightly spaced from each other. Rear edges of the cams 61 and 62 are composed of slant edges 61a and 62a opposed to each other so as to gradually approach each other as they come to the front, and of hold edges 61b and 62b extending laterally in continuation from the slant edges 61a and 62a, respectively.

Figure 16:
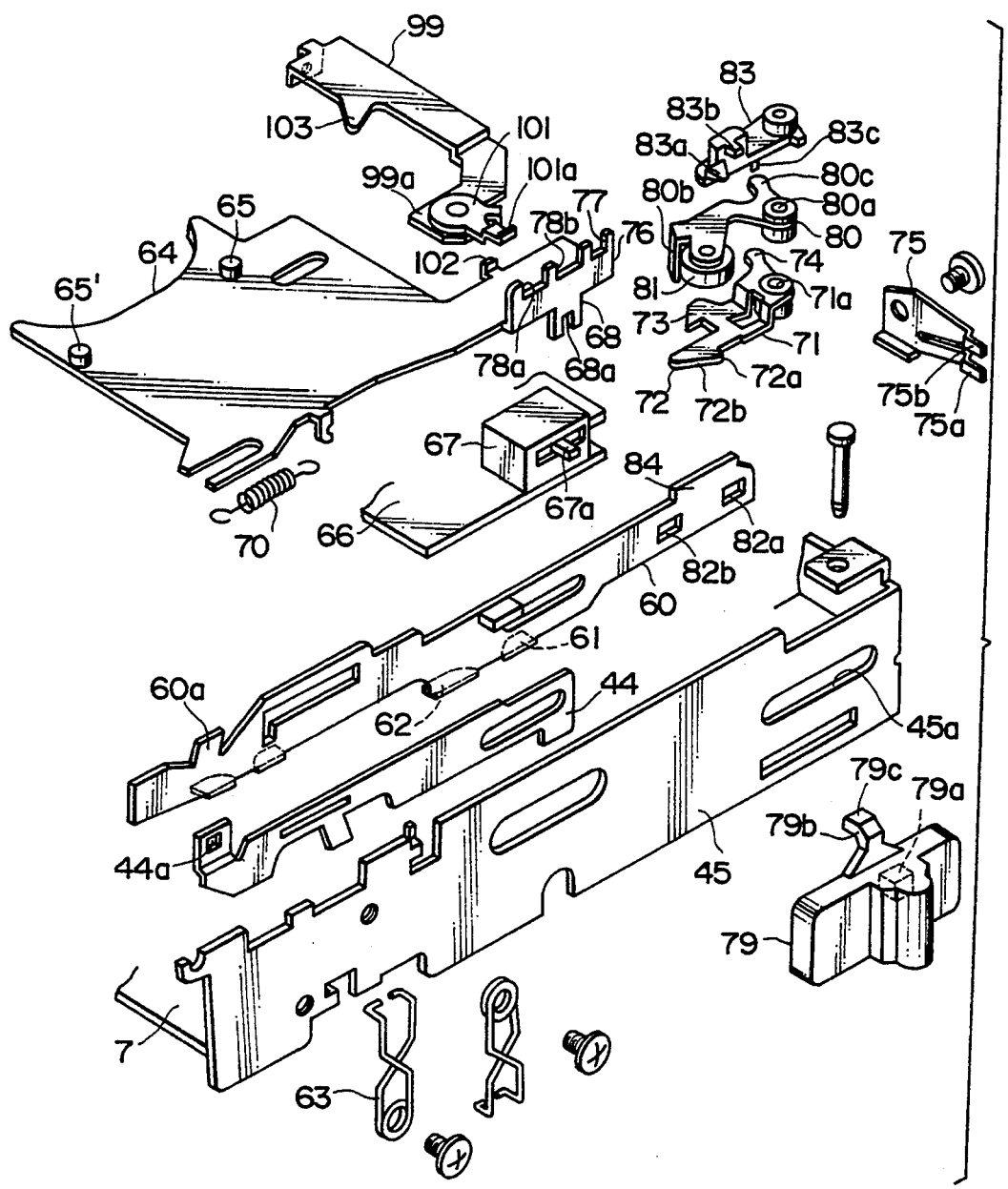
FIG. 16 is an exploded perspective view illustrating various operation levers and lock mechanisms associated therewith.

The mode lever 60 is movable among a neutral position, a playback position on the left side of the neutral position, and a record position on the right side of the neutral position. Reference numeral 63 designates a U-shaped centering spring fixed at a base portion thereof to the front plate 45 of the chassis 7, as depicted in FIG. 16. Two arms of the U-shaped centering spring 63 are elastically engaged with right and left edges of a projection 60a formed at an upper edge of the mode lever 60, respectively, so as to apply a return force to the mode lever 60 to be returned to the neutral position.

When the mode lever 60 is in an intermediate position of a movable range thereof, that is, in the neutral position, the roller 59 of the seesaw lever 58 is positioned between both the cams 61 and 62.

When the mode lever 60 is moved from the neutral position to the left (in the playback mode) or to the right (in the record mode), the slant edge 61a or 62a of the cam 61 or 62 pushes the roller 59 of the seesaw lever 58 rearward to thereby move the support shaft 58a supporting the roller 59 of the seesaw lever 58 rearward. Thereafter, the hold edge 61b or 62b of the cam 61 or 62 comes into contact with the roller 59, and the roller 59 is stably positioned in contact with the hold edge 61b or 62b. This position is an advance position of the seesaw lever 58.

Further, when the mode lever 60 is moved to the right (i.e., the record position), the motor 10 starts rotating and a record circuit (not shown) is operated, thus establishing the record mode. In contrast, when the mode lever 60 is moved to the left (i.e., the playback position), the motor 10 starts rotating and a playback circuit (not shown) is operated, thus establishing the playback mode.

Reference numeral 64 designates a direction lever supported on the lower surface of the chassis 7, so that it is laterally slidable at a substantially laterally central portion on the front half side thereof. Two restriction pins 65 and 65' project upwardly from an upper surface of the direction lever 64 at right and left rear portions thereof, respectively.

When the direction lever 64 is in an intermediate position of a movable range thereof, that is, in a neutral position, the restriction pins 65 and 65' are positioned in proximity to control edges 55d and 56d formed at outer edges of the control portions 55a and 56a of the head levers 55 and 56 at the rear ends thereof, respectively, thereby restricting rearward movement of the control portions 55a and 56a.

Reference numeral 66 designates a circuit board located under the chassis 7, as depicted in FIG. 16. A slide switch 67 for selecting a rotational direction of the motor 10 in constant-speed travelling of the magnetic tape is supported on an upper surface of the circuit board 66 at a front right end portion thereof, and a slide pin 67a projects from a front surface of the slide switch 67. The slide pin 67a is movable among a neutral position, that is, an intermediate position of a movable range thereof (in a stop mode), a right end position of the movable range (in forward travelling of the magnetic tape), and a left end position of the movable range (in reverse travelling of the magnetic tape).

Reference numeral 68 designates a projection projecting downward from a front right end portion of the direction lever 64. A recess 68a is formed at a lower edge of the projection 68, and the slide pin 67a of the slide switch 67 is engaged with the recess 68a of the projection 68. Accordingly, when the direction lever 64 is moved, the slide pin 67a of the slide switch 67 is moved in the same direction.

Accordingly, when the direction lever 64 is moved to the right, and the mode lever 60 is then moved from the neutral position to the left or the right to select the playback mode or the record mode, the magnetic tape travels in a forward direction wherein it is supplied from a supply reel (not shown) engaged with the S-side reel bed 8 and is wound up on a take-up reel (not shown) engaged with the T-side reel bed 8'. In contrast, when the direction lever 64 is moved to the left, and the mode lever 60 is then moved from the neutral position to the left or the right to select the playback mode or the record mode, the magnetic tape travels in a reverse direction wherein it is supplied from the take-up reel engaged with the T-side reel bed 8' and is wound up on the supply reel engaged with the S-side reel bed 8.

Figure 10:
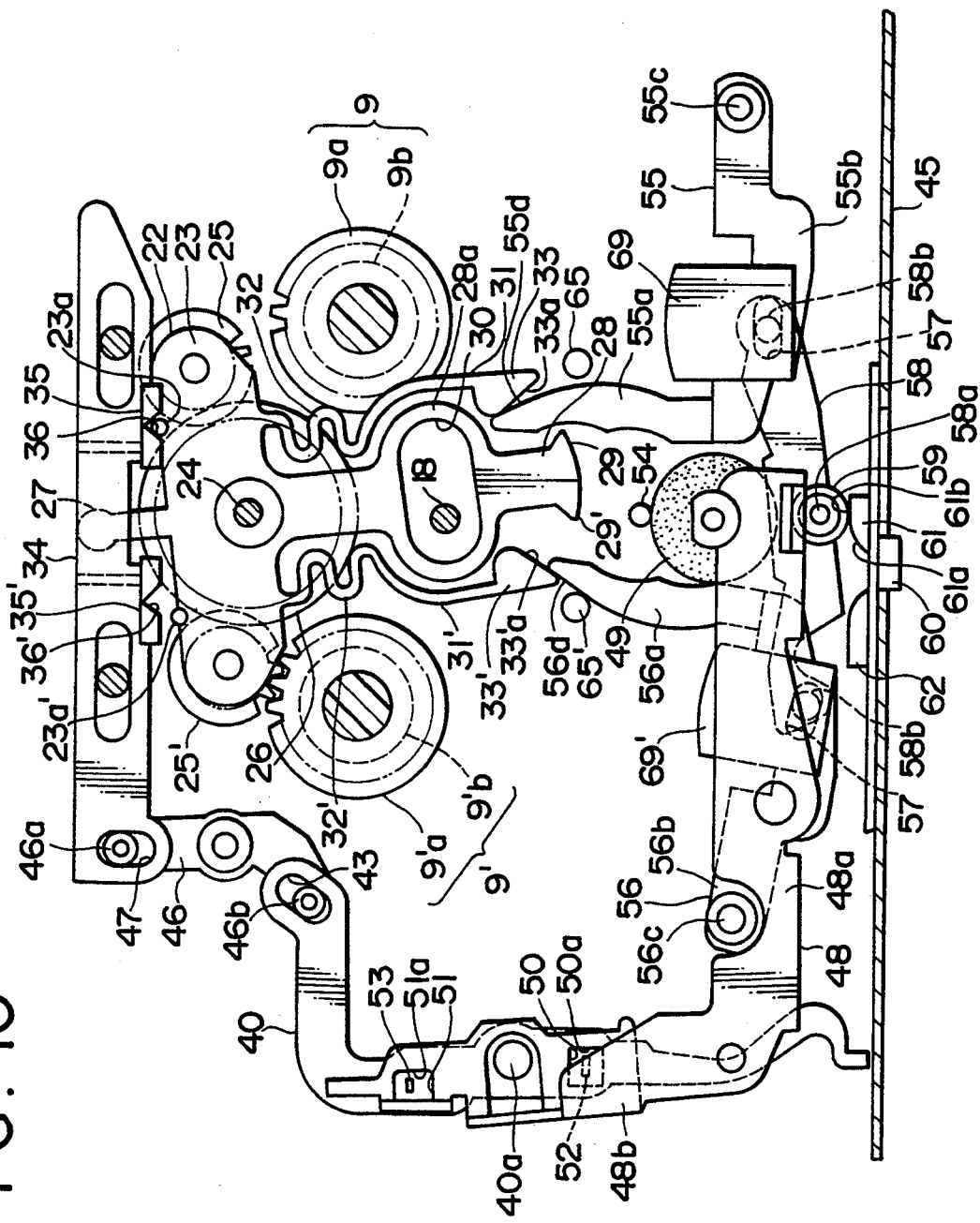
FIG. 10 is a plan view illustrating a forward playback condition.
Figure 11:
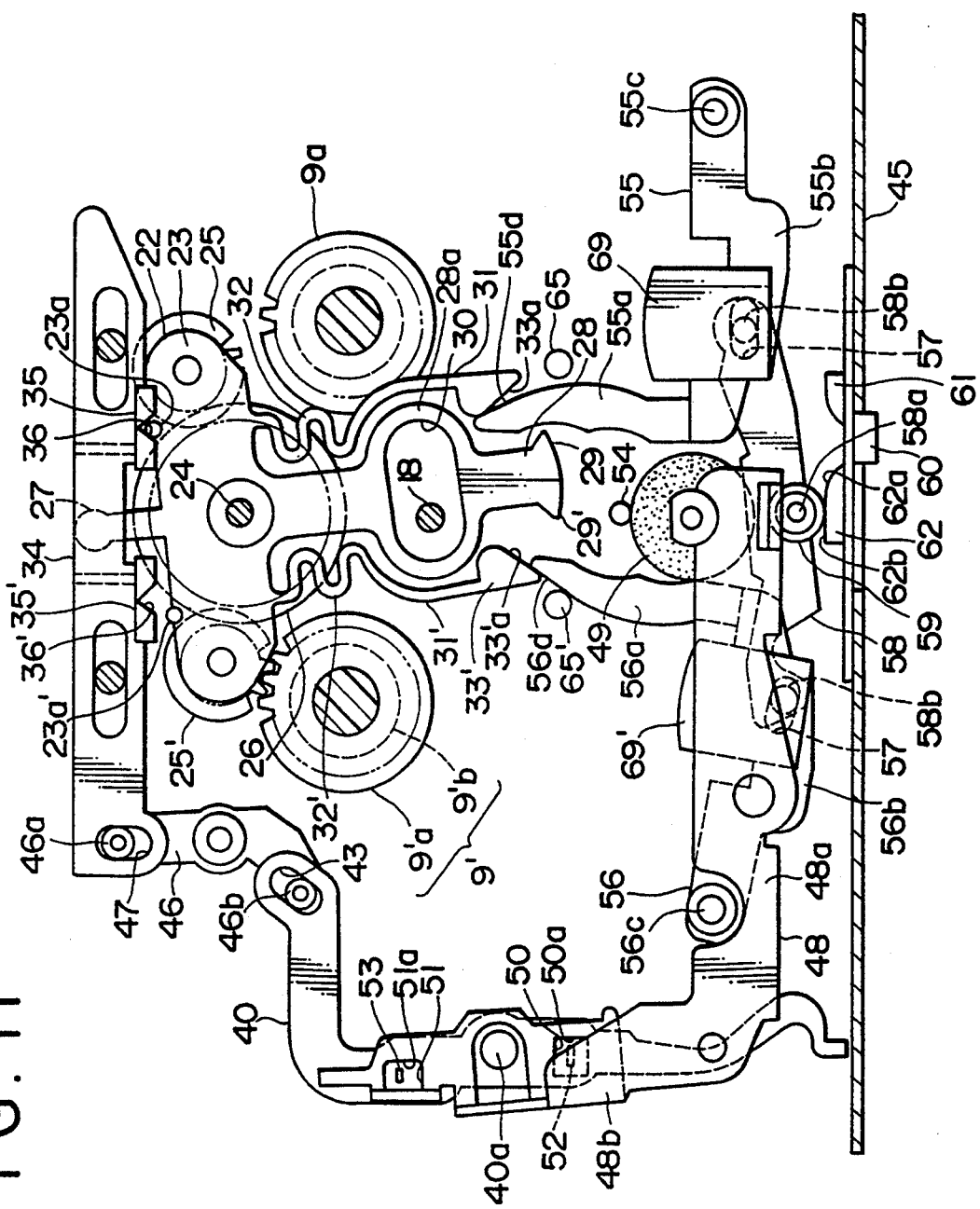
FIG. 11 is a plan view illustrating a forward record condition.

More specifically, when the direction lever 64 is moved to the right, as shown in FIG. 10 and 11, the right restriction pin 65 is moved rightward away from the control edge 55d of the control portion 55a of the right head lever 55, and the left restriction 65' is moved rightward to contact the control edge 56d of the control portion 56a of the left head lever 56.

In this condition, when the mode lever 60 is moved to the playback position (i.e., to the left, as depicted in FIG. 10) or the record position (i.e., to the right, as depicted in FIG. 11), the central portion of the seesaw lever 58 is pushed by the cam 61 or 62 of the mode lever 60 to move rearward, and the joint pins 58b of the seesaw lever 58 will also be moved rearward. However, since the joint pins 58b are engaged with the joint holes 57 of the head levers 55 and 56, respectively, and the left head lever 56 is restricted from moving rearward by the contact of the left restriction pin 65' of the direction lever 64 with the control edge 56d, the left joint pin 58b engaged with the joint hole 57 of the left head lever 56 cannot be moved rearward. Accordingly, the seesaw lever 58 is pivoted about the left joint pin 58b in the counterclockwise direction, and the right joint pin 58b only is largely moved rearward. Accordingly, the right head lever 55 is pivoted in the clockwise direction by the rearward movement of the right joint pin 58b engaged with the joint hole 57 of the right head lever 55, and the rear end of the control portion 55a of the right head lever 55 is moved rearward.

When the rear end of the control portion 55a of the right head lever 55 is moved rearward as mentioned above, the control edge 55d of the control portion 55a urges the slanted inside edge 33a of the front end portion 33 of the right depressed arm 31 of the take-up arm 22 in a right rear direction to thereby pivot the take-up arm 22 in the counterclockwise direction. Accordingly, the left play gear 25' of the take-up arm 22 is brought into mesh with the large gear 9'a of the T-side reel bed 8'. In this condition, when the motor 10 is rotated, the magnetic tape travels in the forward direction.

Figure 12:
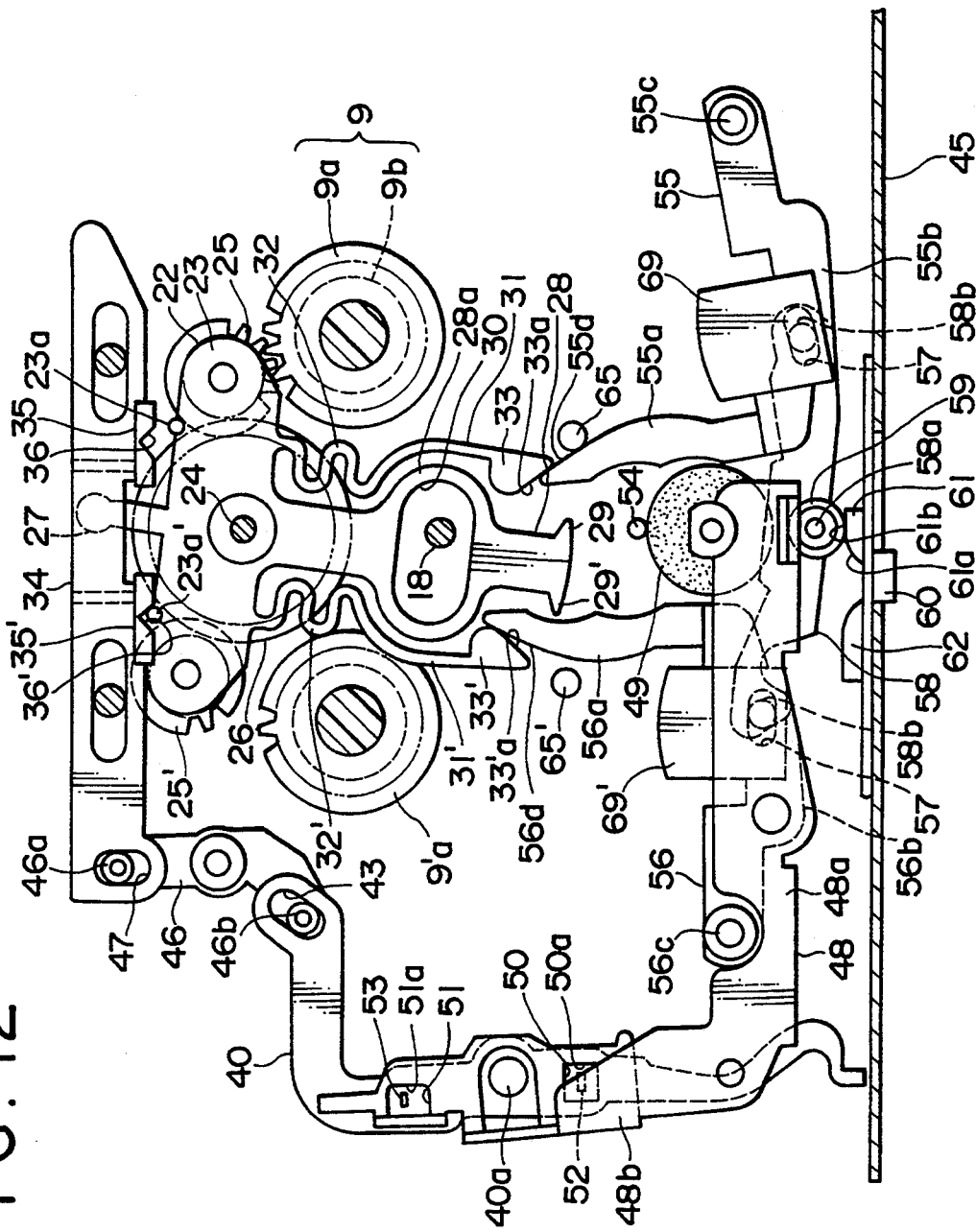
FIG. 12 is a plan view illustrating a reverse playback condition.
Figure 13:
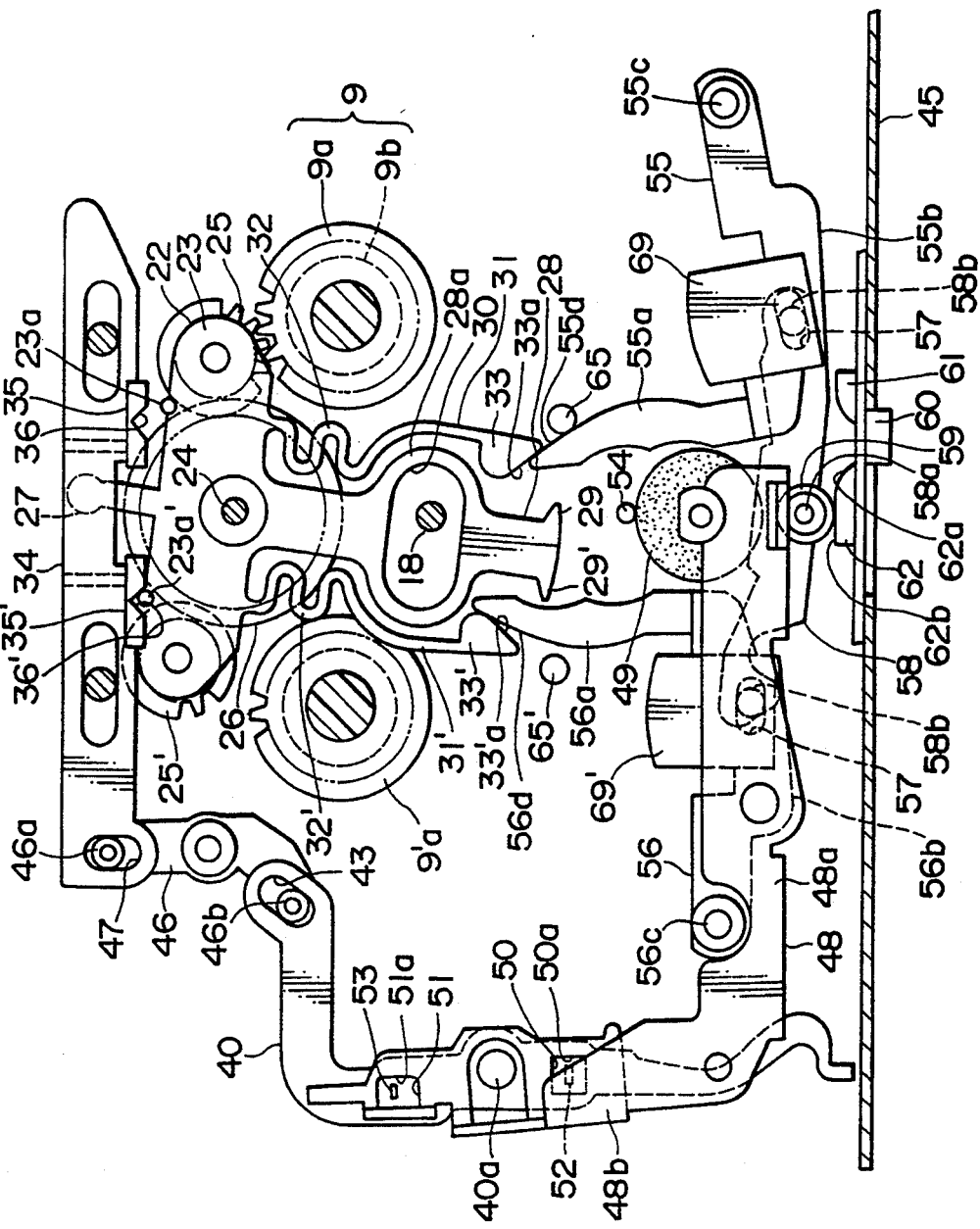
FIG. 13 is a plan view illustrating a reverse record condition.

In contrast, when the direction lever 64 is moved to the left, as shown in FIGS. 12 and 13 the left restriction pin 65' is moved leftward away from the control edge 56d of the control portion 56a of the left head lever 56, and the right restriction 65 is moved leftward to contact the control edge 55d of the control portion 55a of the right head lever 55.

In this condition, when the mode lever 60 is moved to the playback position (i.e., to the left, as depicted in FIG. 12) or the record position (i.e., to the right, as depicted in FIG. 13), the central portion of the seesaw lever 58 is pushed by the cam 61 or 62 of the mode lever 60 to move rearward, and the joint pins 58b of the seesaw lever 58 will also be moved rearward. However, since the joint pins 58b are engaged with the joint holes 57 of the head levers 55 and 56, respectively, and the right head lever 55 is restricted from moving rearward by the contact of the right restriction pin 65 of the direction lever 64 with the control edge 55d, the right joint pin 58b engaged with the joint hole 57 of the right head lever 55 cannot be moved rearward. Accordingly, the seesaw lever 58 is pivoted about the right joint pin 58b in the clockwise direction, and the left joint pin 58b only is largely moved rearward. Accordingly, the left head lever 56 is pivoted in the counterclockwise direction by the rearward movement of the left joint pin 58b engaged with the joint hole 57 of the left head lever 56, and the rear end of the control portion 56a of the left head lever 56 is moved rearward.

When the rear end of the control portion 56a of the left head lever 56 is moved rearward as mentioned above, the control edge 56d of the control portion 56a urges the slanted inside edge 33'a of the front end portion 33' of the left depressed arm 31' of the take-up arm 22 in a left rear direction to thereby pivot the take-up arm 22 in the clockwise direction. Accordingly, the right play gear 25 of the take-up arm 22 is brought into mesh with the large gear 9a of the S-side reel bed 8. In this condition, when the motor 10 is rotated, the magnetic tape travels in the reverse direction.

Magnetic heads 69 and 69' are supported on the upper surfaces of the front arms 55b and 56b of the head levers 55 and 56, respectively. When the control portion 55a or 56a of the head lever 55 or 56 is moved rearward, the magnetic head 69 or 69' is moved to its operative position to contact the magnetic tape.

Figure 14:
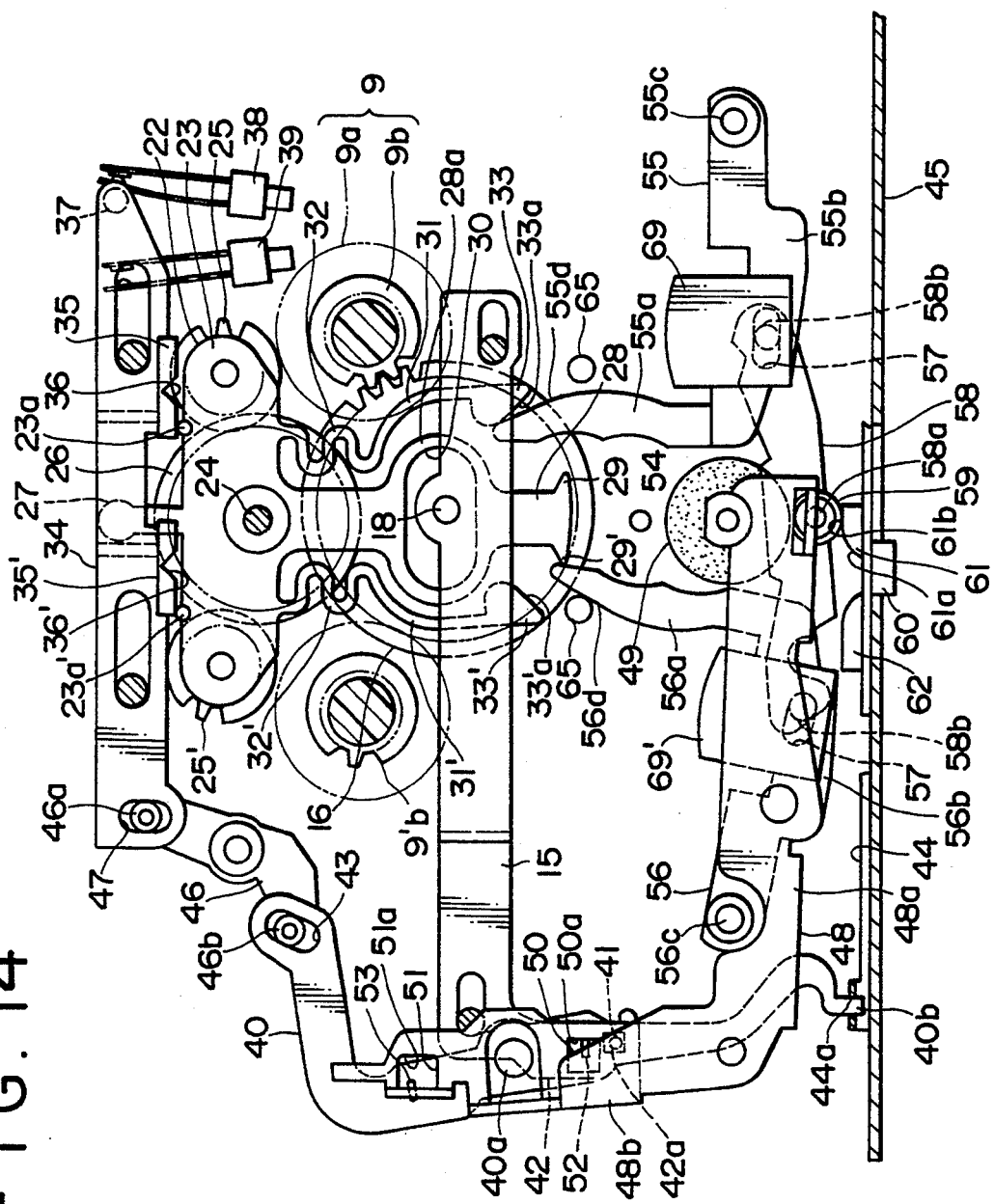
FIG. 14 is a plan view illustrating a cue condition.
Figure 15:
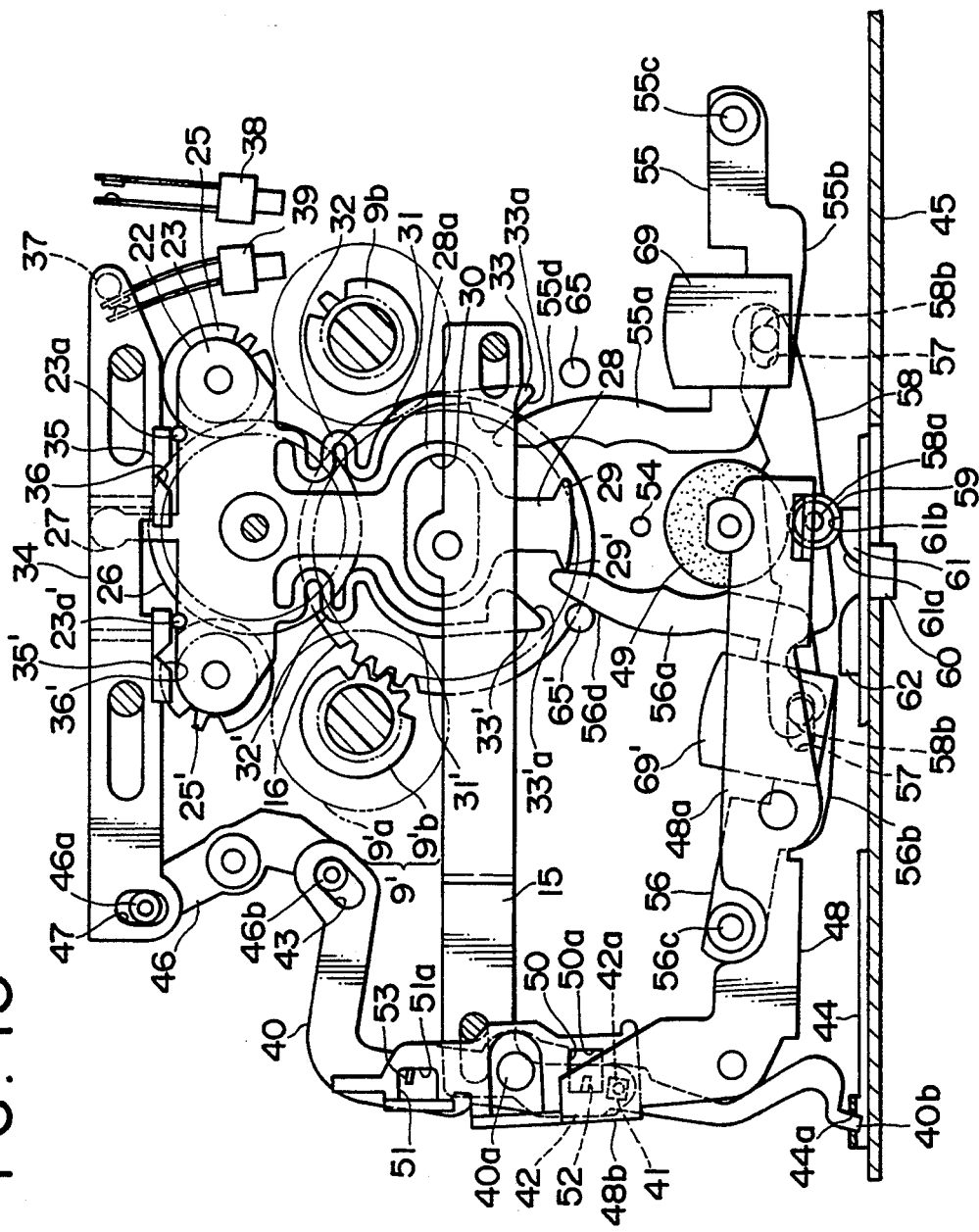
FIG. 15 is a plan view illustrating a review condition.

In establishing the cue condition or the review condition by moving the FR lever 44 in the playback condition, the take-up arm 22 is slightly pivoted in such a direction that the play gear 25 or 25' is separated from the large gear 9a or 9'a of the reel bed 8 or 8', as depicted in FIGS. 14 and 15. In this case, since the control portion 55a or 56a of the head lever 55 or 56 is kept in the rearward moved condition, the front end portion 33 or 33' of the depressed arm 31 or 31' of the take-up arm 22 is hindered by the rear end portion of the control portion 55a or 56a of the head lever 55 or 56. However, the spring portion 32 or 32' of the depressed arm 31 or 31' is flexed to permit the slight pivotal movement of the take-up arm 22.

As the magnetic head 69 or 69' is maintained in the operative position, it may read signals recorded in the magnetic tape, thereby establishing the cue condition or the review condition.

Reference numeral 70, as depicted in FIG. 16 designates a tension spring stretched between the direction lever 64 and the chassis 7, so that the direction lever 64 is normally biased to the left, that is, the reverse position by a resilient force of the tension spring 70.

Reference numeral 71 designates a direction lock member for locking the direction lever 64 in the right position, that is, in the forward position. The direction lock member 71 is pivotably supported at a right front portion 71a thereof to the upper surface of the chassis 7 at a right front portion thereof.

The direction lock member 71 is integrally formed with a long arm 72, a short arm 73, and a depressed portion 74. The long arm 72 projects leftward from a left front portion of the direction lock member 71, and the short arm 73 projects leftward from a left rear portion of the direction lock member 71. Further, the depressed portion 74 projects rearward from a right rear portion of the direction lock member 71.

A pawl 72a projects frontward from a front edge of the long arm 72 at a left end portion thereof. The pawl 72a has a slant front edge 72b gently inclined rearward as it approaches a left end thereof.

Figure 17:
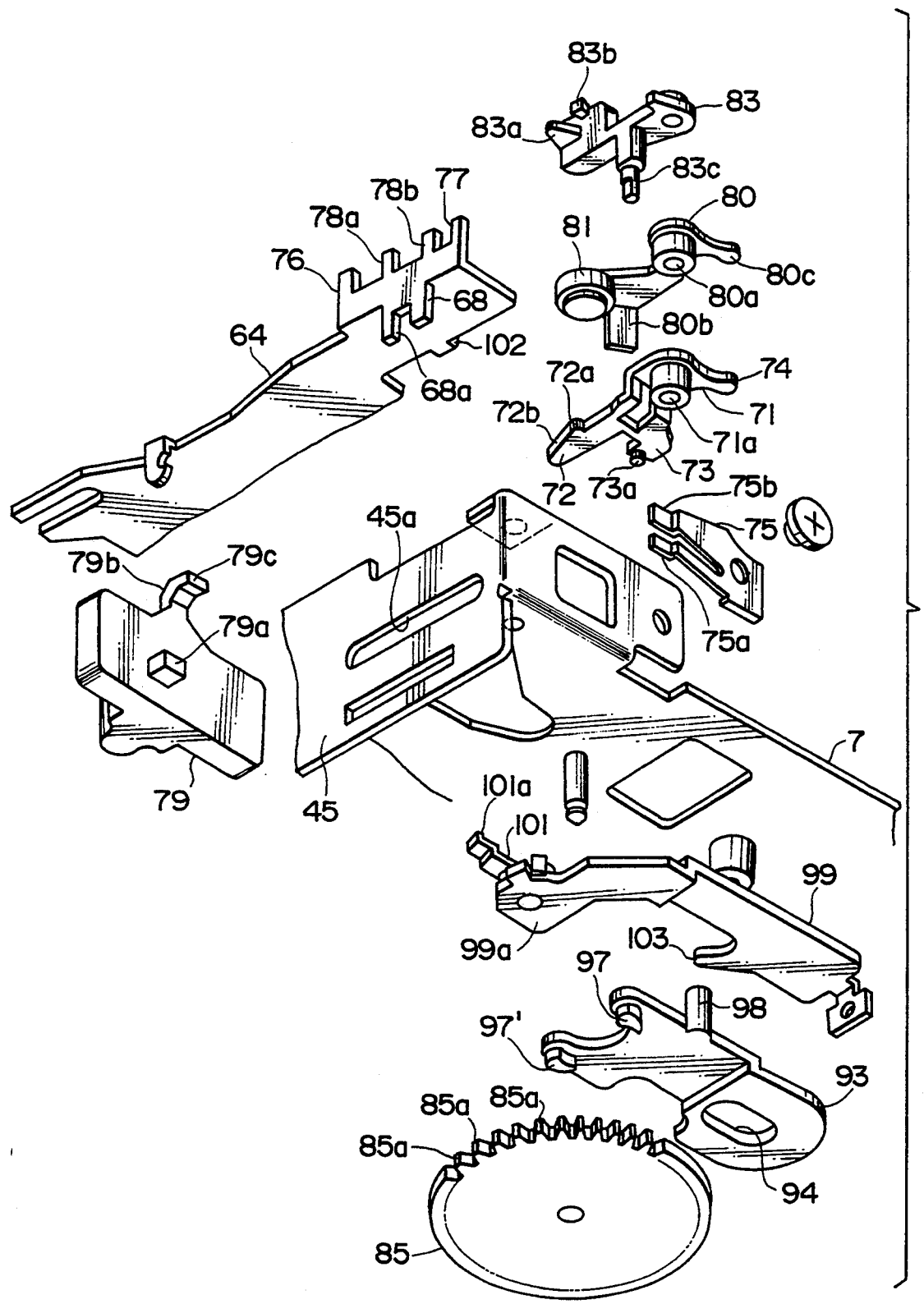
FIG. 17 is an exploded perspective view illustrating a direction lever, a lock member therefor, and a tape end detecting mechanism.

A projection 73a is formed on a lower surface of the short arm 73 at a left end portion thereof, as depicted in FIG. 17.

Reference numeral 75 designates a transversely elongated leaf spring fixed at a rear end portion thereof to the chassis 7. The leaf spring 75 is formed at a front portion thereof to form two elastic arms 75a and 75b. The lower elastic arm 75a of the leaf spring 75 is in elastic contact with a rear end of the depressed portion 74 of the direction lock member 71 from the right side thereof, thereby normally applying a counterclockwise torque to the direction lock member 71.

A rising portion 76 is formed to project upwardly from the front edge of the direction lever 64 at a right end portion thereof, and three recesses 77, 78a and 78b are formed on an upper edge of the rising portion 76 so as to be juxtaposed in the lateral direction. The recesses 78a and 78b are adapted to selectively engage the pawl 72a of the direction lock member 71, and the recess 77 is adapted to engage a projection 79a of a direction knob 79 which will be hereinafter described.

The projection 79a is formed on a rear surface of the direction knob 79. The projection 79a is inserted through a laterally elongated through hole 45a formed through the front plate 45 of the chassis 7, and a rear end portion of the projection 79a is engaged with the recess 77 of the direction lever 64.

Further, another projection 79b is formed on an upper surface of the direction knob 79, and a locked portion 79c is formed at an upper end of the projection 79b so as to project rearward.

Figure 19:
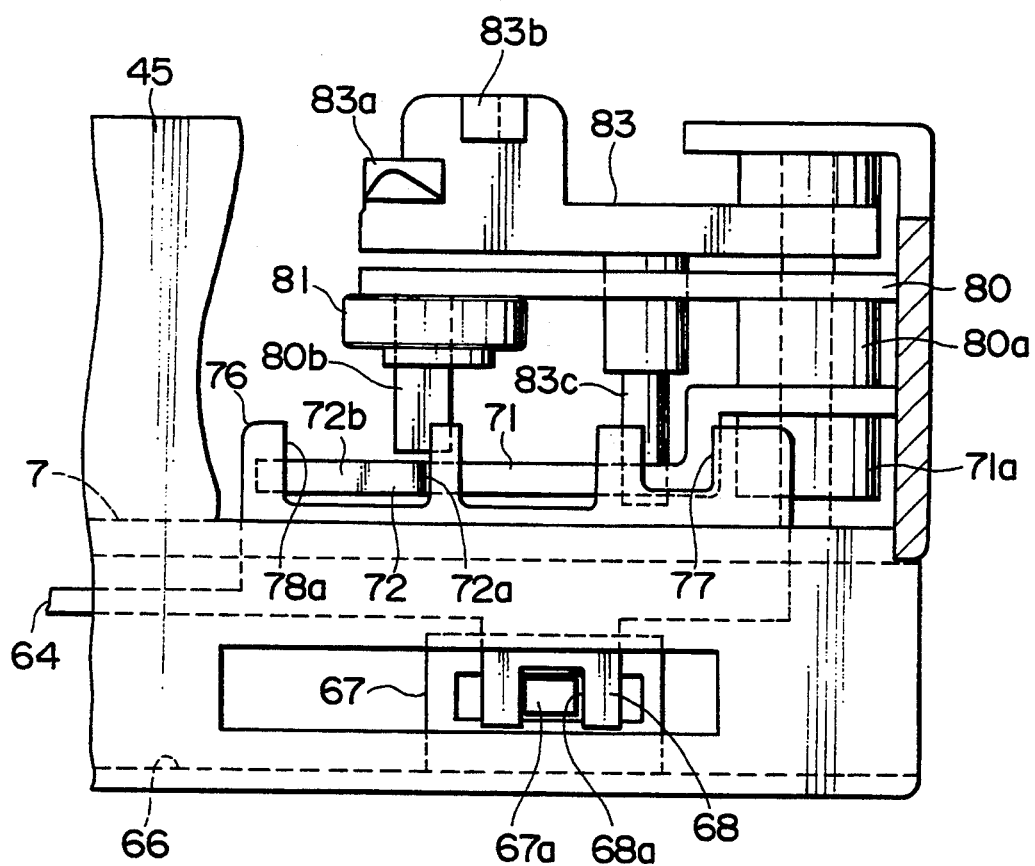
FIG. 19 is an enlarged elevational view illustrating the lock mechanisms for the various operation levers.
Figure 20:
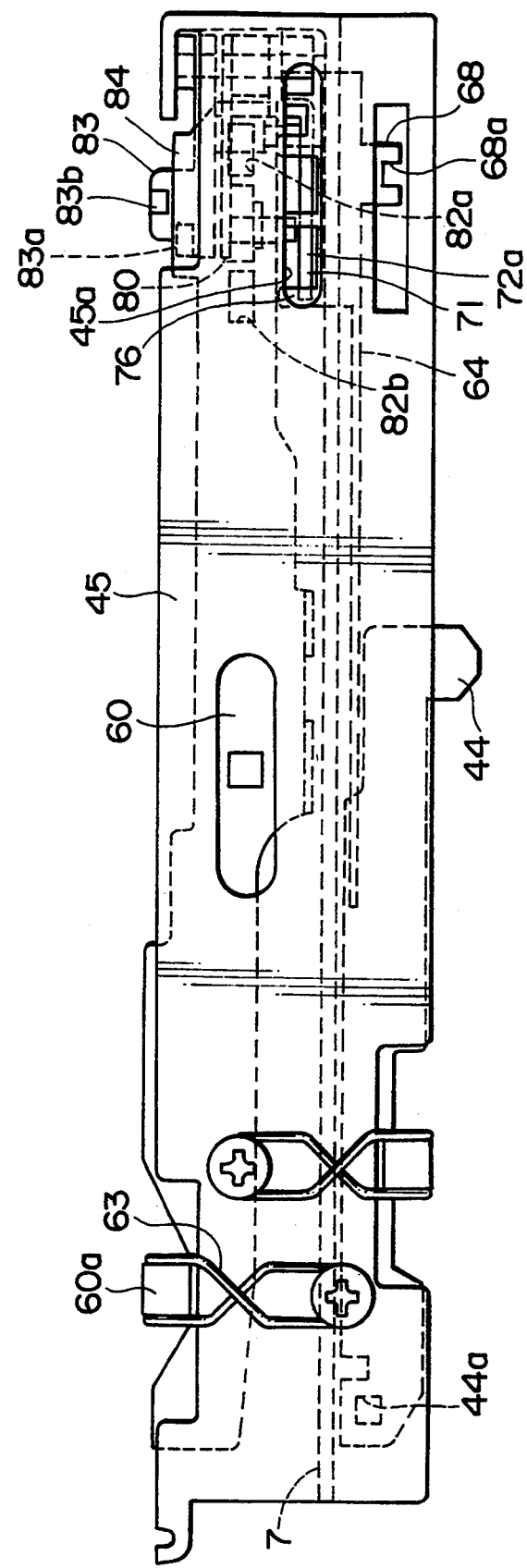
FIG. 20 is an elevational view illustrating a stop condition.

When the direction lever 64 is moved to the forward position, the position of the left recess 78a of the direction ever 64 becomes identical with the position of the pawl 72a of the direction lock member 71, as depicted in FIG. 19, and the pawl 72a is brought into engagement with the recess 78a by the torque of the direction lock member 71 applied from the elastic arm 75a of the leaf spring 76. In this way, the direction lever 64 is locked in the forward position. Of course, the pawl 72a may be forcibly disengaged from the recess 78a by applying a relatively strong leftward force to the direction knob 79.

When the pawl 72a of the direction lock member 71 is disengaged from the recess 78a, the direction lever 64 is moved to the left by a tensile force of the tension spring 70 to reach the reverse position.

When the direction lever 64 reaches the reverse position as mentioned above, the right recess 78b of the direction lever 64 is shifted to receive the pawl 72a of the direction lock member 71.

Reference numeral 80 designates a mode lock member located over the direction lock member 71 and pivotably supported at a right front portion 80a thereof to the same support shaft supporting the direction lock member 71. A projection 80b is formed at a left rear portion of the mode lock member 80 so as to project downwardly, and a roller 81 is rotatably supported at a left front portion of the mode lock member 80. Further, a depressed portion 80c is formed at a right rear portion of the mode lock member 80 so as to project rearward. The upper elastic arm 75b of the leaf spring 75 is in elastic contact with a rear end of the depressed portion 80c of the mode lock member 80 from the right side thereof, thereby normally applying a counterclockwise torque to the mode lock member 80.

Figure 21:
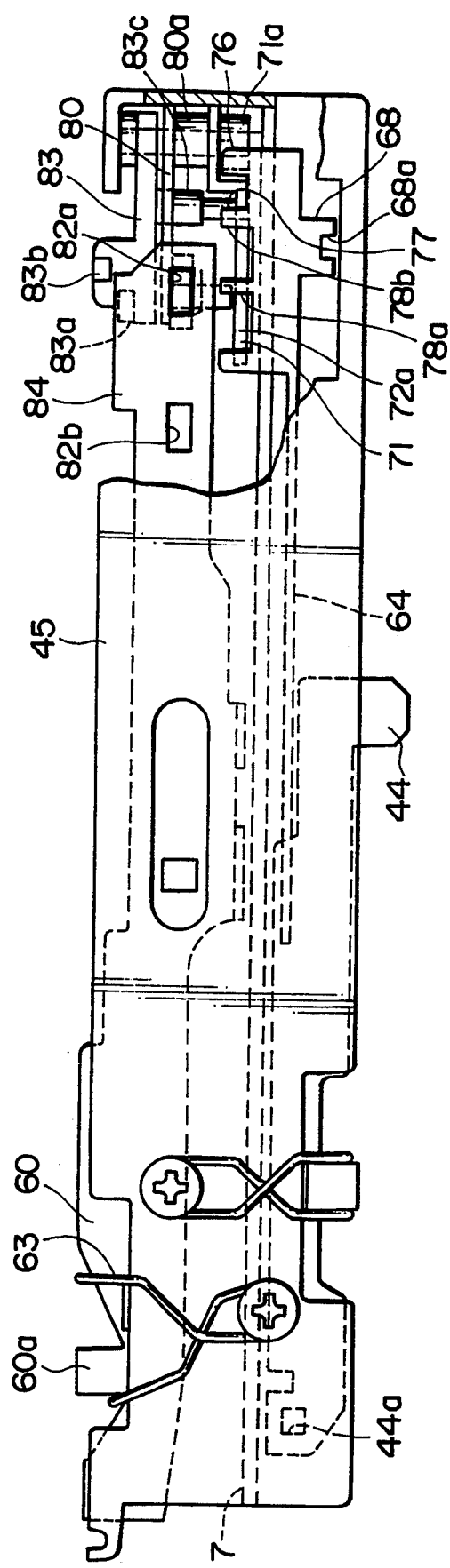
FIG. 21 is a partially cutaway elevational view illustrating a forward playback condition.
Figure 22:
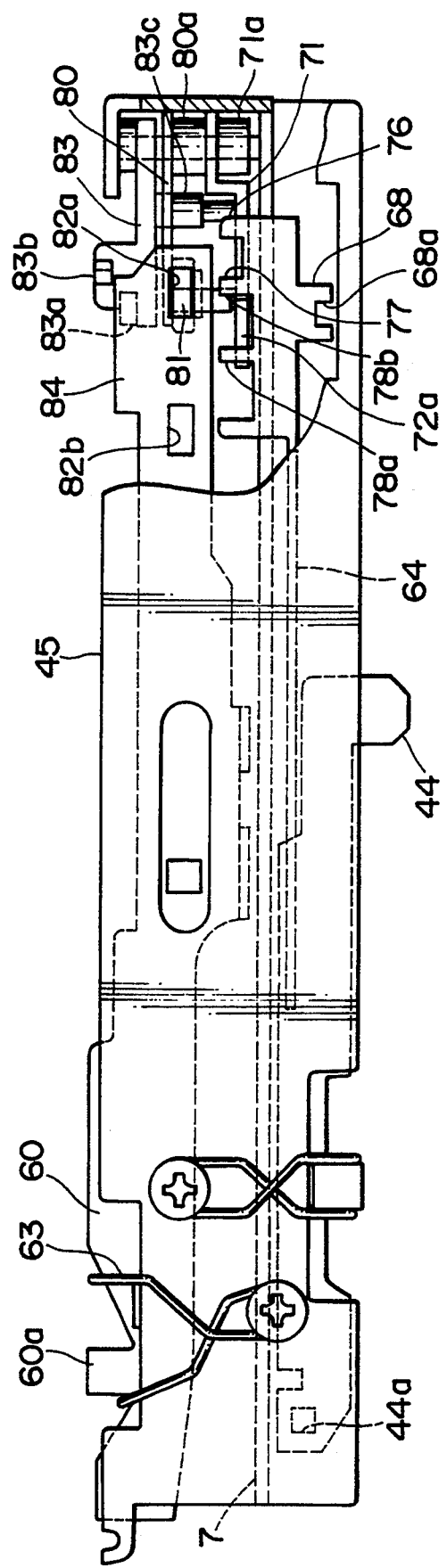
FIG. 22 is a view similar to FIG. 21, illustrating a reverse playback condition.
Figure 23:
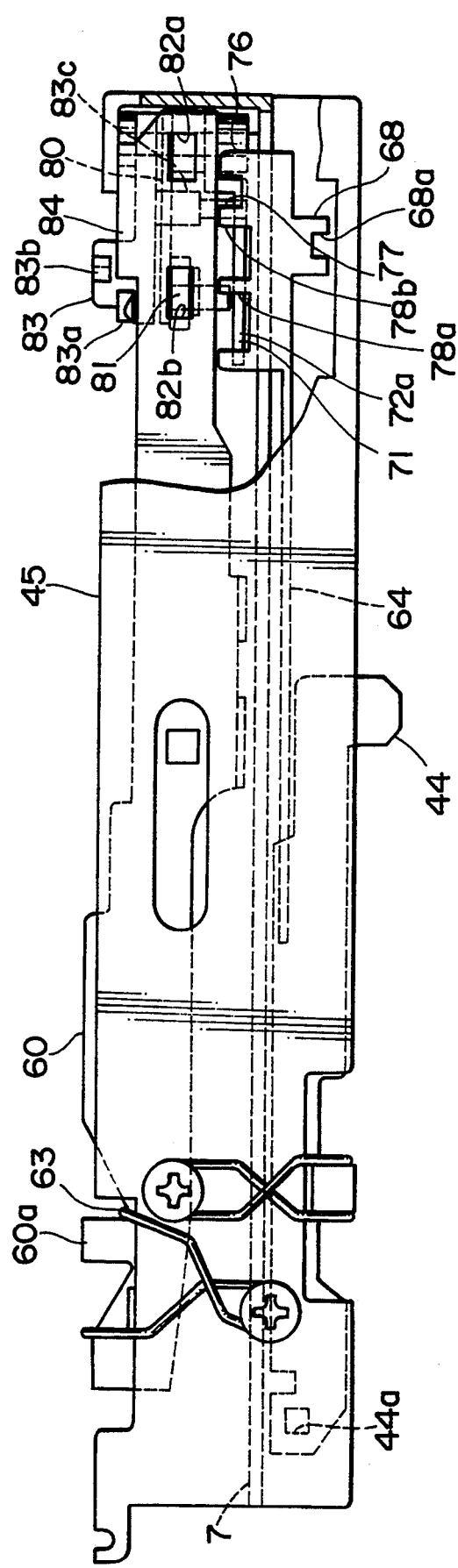
FIG. 23 is a view similar to FIG. 21, illustrating a forward record condition.

Two laterally elongated holes 82a and 82b are formed at a right end portion of the mode lever 60 so as to be laterally spaced from each other. When the mode lever 60 is moved to the record position, the roller 81 of the mode lock member 80 is brought into engagement with the left hole 82b of the mode lever 60, as depicted in FIG. 23, while when the mode lever 60 is moved to the playback position, the roller 81 of the mode lock member 80 is brought into engagement with the right hole 82a of the mode lever 60, as depicted in FIG. 21. In each of the record position and the playback position, click stop of the mode lever 60 is effected by the engagement of the roller 81 with the hole 82a or 82b.

Reference numeral 83 designates a knob lock member located over the mode lock member 80 and pivotably supported at a right end portion thereof to the same support shaft supporting the direction lock member 71 and the mode lock member 80.

Figure 25:
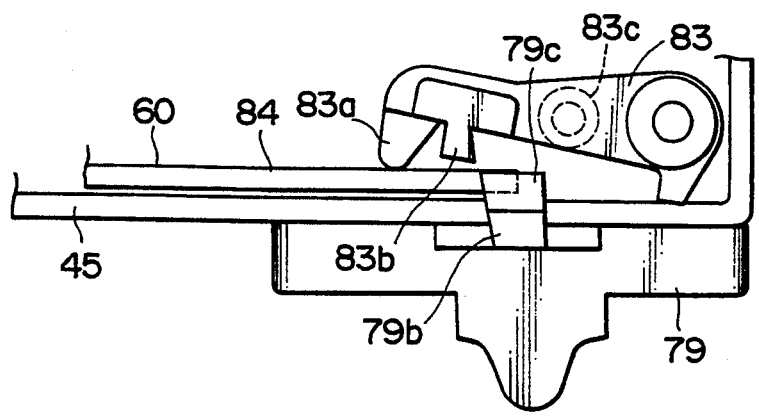
FIG. 25 is an enlarged plan view illustrating a knob lock member in a playback condition.
Figure 26:
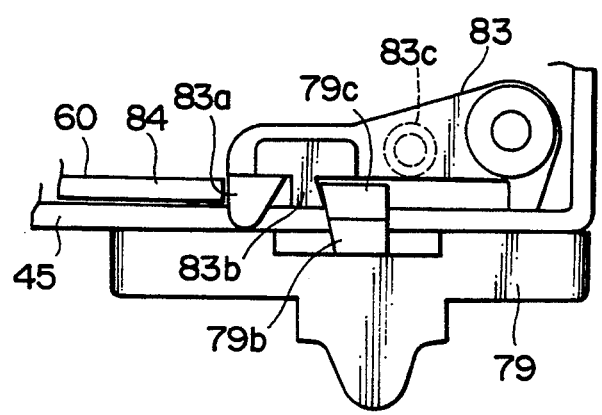
FIG. 26 is a view similar to FIG. 25, illustrating a forward record condition.
Figure 27:
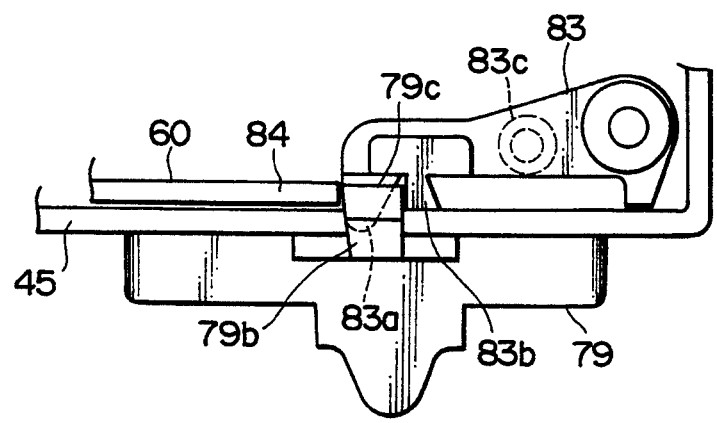
FIG. 27 is a view similar to FIG. 25, illustrating a reverse record condition.

A controlled projection 83a is formed at a left end portion of the knob lock member 83 so as to project frontward, and a locking projection 83b is also formed at the left end portion of the knob lock member 83 on the side just right of the controlled projection 83a so as to project frontward, as shown in FIGS. 25-27. The locking projection 83b is positioned at a level just higher than that of the controlled projection 83a, as depicted in FIG. 19.

Further, a controlled pin 83c is formed at a laterally central portion of the knob lock member 83 so as to project downward. The controlled pin 83c is positioned between the base portions of the two arms 72 and 73 of the direction lock member 71. A counterclockwise torque is normally applied from a spring (not shown) to the knob lock member 83.

A control projection 84 having a given lateral length is formed at the right end portion of the mode lever 60 so as to project upward from the upper edge thereof. The control projection 84 of the mode lever 60 is positioned at the same level as that of the controlled projection 83a of the knob lock member 83. Further, the locking projection 83b of the knob lock member 83 is positioned at a level just higher than an upper edge of the control projection 84.

When the mode lever 60 is in any position other than the record position, as depicted in FIG. 25, a rear surface of the control projection 84 is opposed to the controlled projection 83a of the knob lock member 83, and accordingly the locking projection 83b of the knob lock member 83 is in a retracted position where a front end of the locking projection 83b is positioned on the rear side of a locus of movement of the locked portion 79c of the direction knob 79. Accordingly, the knob lock member 83 does not interfere with the movement of the direction knob 79, that is, the movement of the direction lever 64.

When the mode lever 60 is moved to the record position, a left end of the control projection 84 comes to the right side of the controlled projection 83a of the knob lock member 83. That is, the controlled portion 83a of the knob lock member 83 is counterclockwise pivoted to reach a lock position on the left side of the control projection 84. In this condition, when the direction lever 64 is in the forward position, as depicted in FIG. 26, the locking projection 83b of the knob lock member 83 comes to the left side of the locked portion 79c of the direction knob 79, while when the direction lever 64 is in the reverse position, as depicted in FIG. 27, the locking projection 83b of the knob lock member 83 comes to the right side of the locked portion 79c of the direction knob 79. Thus, the leftward movement and the rightward movement of the direction knob 79 are inhibited. when the mode lever 60 is in the reverse record position.

According to this operation, it is prevented that a tape travelling direction is manually changed during recording.

When the mode lever 60 is moved from the record position to the left, the left end of the control projection 84 pushes the controlled portion 83a of the knob lock member 83 to pivot the knob lock member 83 clockwise to an unlock position where the locking projection 83b is retracted from the locus of movement of the locked portion 79c of the direction knob 79. In this case, since there is defined a sufficient space between the controlled pin 83c of the knob lock member 83 and the rear arm 73 of the direction lock member 71, there is no possibility that the direction lock member 71 is pivoted clockwise by the clockwise pivotal movement of the knob lock member 83.

As will be hereinafter described, when the direction lock member 71 is pivoted clockwise by an automatic reverse mechanism or an automatic shut-off mechanism, the controlled pin 83c of the knob lock member 83 is urged rearward by the base portion of the front arm 72 of the direction lock member 71. Accordingly, the knob lock member 83 is pivoted clockwise to unlock the direction knob 79.

Figure 18:
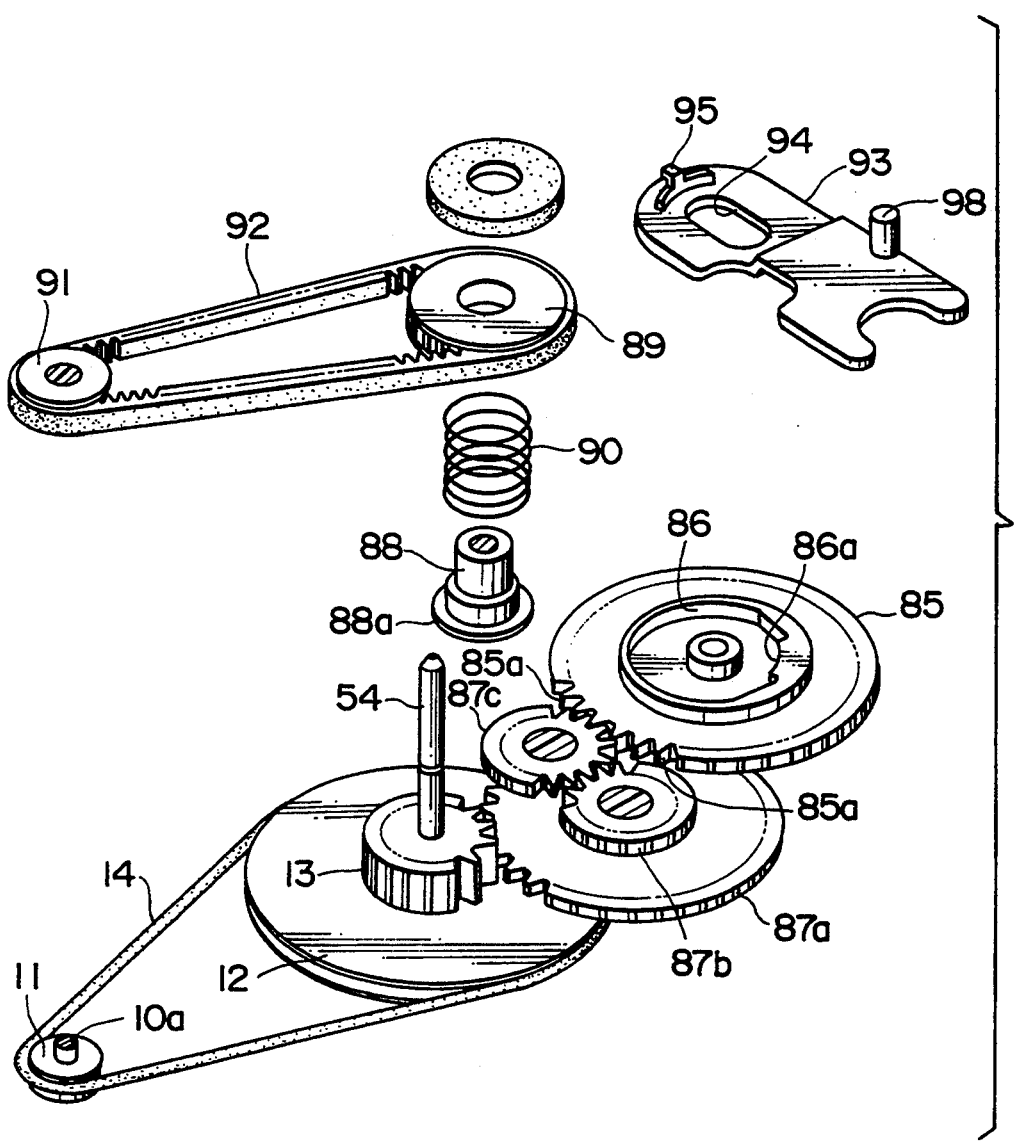
FIG. 18 is a partially exploded perspective view of a mechanism for transmitting a torque to the tape end detecting mechanism.

Reference numeral 85 designates a cam gear rotatably supported on the lower surface of the chassis 7 at a right front portion thereof. A plurality of gear teeth 85a are formed on a portion of the outer circumference of the cam gear 85, and an annular cam 86 is formed on the upper surface of the cam gear 85 so as to project upward, as depicted in FIG. 18. An inner circumferential surface of the cam 86 is formed with a projection 86a. Rotation of the driving gear 13 is normally transmitted through a gear train 87a, 87b and 87c to the cam gear 85.

Accordingly, while the motor 10 is in rotation, the cam gear 85 is always rotated. More specifically, when the magnetic tape travels in the forward direction, the cam gear 85 is rotated in the counterclockwise direction. While when the magnetic tape travels in the reverse direction, the cam gear 85 is rotated in the clockwise direction.

Reference numeral 88 designates a support shaft projecting downward from the lower surface of the chassis 7 at a right rear portion thereof. The support shaft 88 is formed at a lower end thereof with a flanged spring bearing portion 88a.

Reference numeral 89 designates a counter pulley rotatably supported on the support shaft 88 at an upper end portion thereof. A coil spring 90 is interposed under compression between a lower surface of the counter pulley 89 and the spring bearing portion 88a of the support shaft 88, so that the counter pulley 89 is normally biased upward by a resilient force of the coil spring 90.

Reference numeral 91 designates a counter pulley integrally formed on a lower surface of the relay gear 26. An endless timing belt 92 is wrapped between the counter pulley 91 and the counter pulley 89.

Accordingly, while the magnetic tape is travelling, the counter pulley 89 is kept rotating. More specifically, when the magnetic tape travels in the forward direction, the counter pulley 89 is rotated in the clockwise direction. Whereas, when the magnetic tape travels in the reverse direction, the counter pulley 89 is rotated in the counterclockwise direction.

When the magnetic tape is fully supplied from the tape reel, both the reel beds 8 and 8' become nonrotatable, and therefore the relay gear 26 meshing with the play gears 25 and 25' one of which meshes the large gear 9a or 9'a of the reel bed 8 or 8' stops rotating. Accordingly, a large load is applied from the relay gear 26 to the limiter gear 17 meshing therewith, and therefore slip occurs between the limiter gear 17 and the intermediate gear 16 elastically contacting therewith through the torque limiter 19. As a result, the counter pulley 89 connected through the endless timing belt 92 to the counter pulley 91 integral with the relay gear 26 stops rotating.

Reference numeral 93 designates a plate-like friction arm elongated in the transverse direction. A transversely elongated hole 94 is formed through the friction arm 93 at a rear portion thereof, and an upper end portion of the support shaft 88 is inserted through the elongated hole 94. Accordingly, the friction arm 93 is supported on the chassis 7 such that it is movable in a transverse direction.

A spring bearing portion 95 projects upward from an upper surface of the friction arm 93 at a position behind the elongated hole 94. The spring bearing portion 95 is formed in a gently arcuate shape so as to protrude at a central portion thereof.

Figure 24:
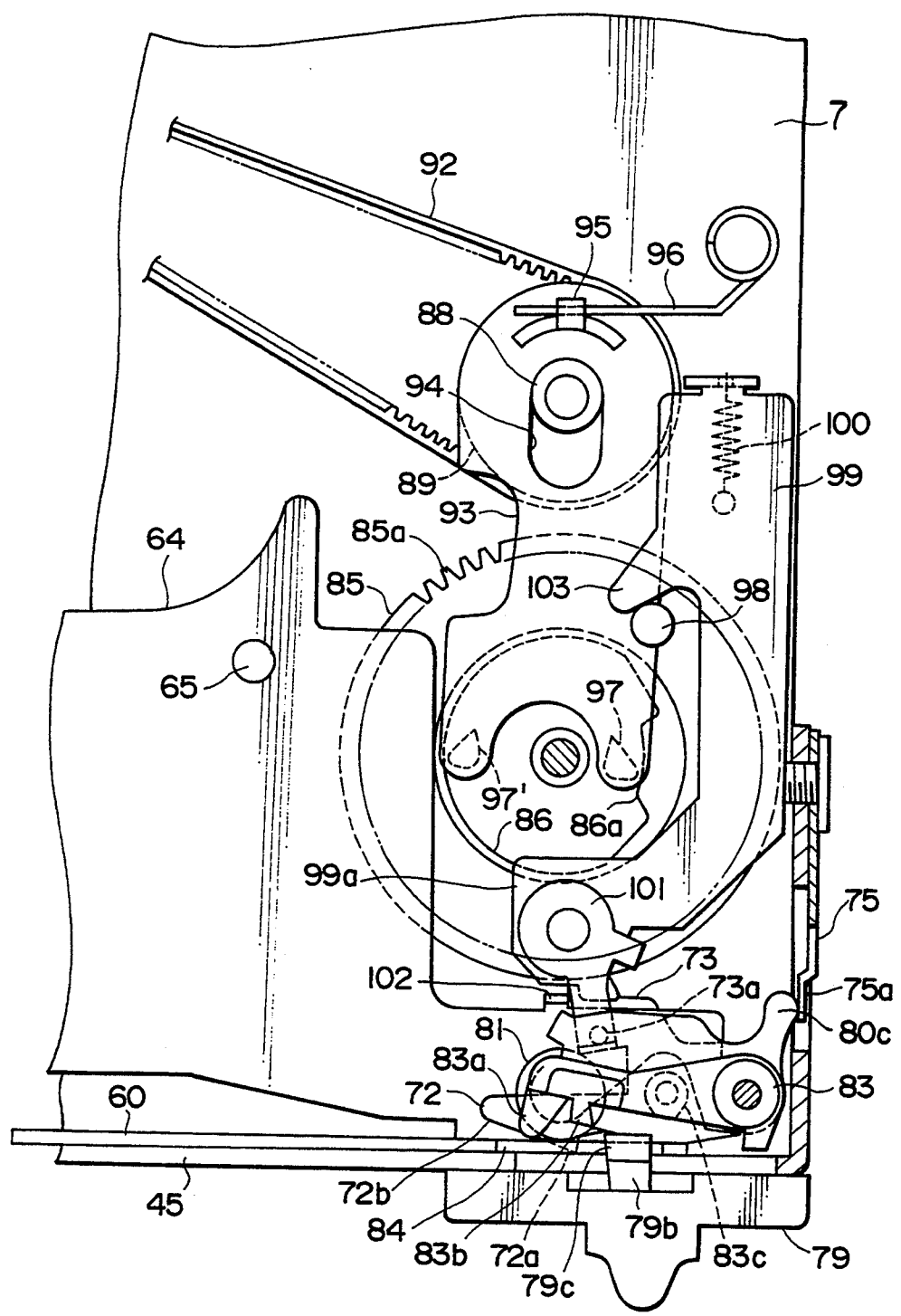
FIG. 24 is an enlarged plan view illustrating the tape end detecting mechanism.

Reference numeral 96 designates a torsion spring supported at a base portion thereof to the chassis 7, as depicted in FIG. 24. A free end portion of the torsion spring 96 is in resilient contact with the spring bearing portion 95 of the friction arm 93 from the rear side thereof, so that the friction arm 93 is normally biased frontward by a resilient force of the torsion spring 96.

The friction arm 93 is formed at a front end thereof to form two arm portions. Two projections 97 and 97' each having a teardrop shape as viewed in plan are formed on lower surfaces of the two arm portions of the friction arm 93. That is, the projections 97 and 97' are thin at their rear ends and thick at their front ends. The projections 97 and 97' are located within an inside area surrounded by the annular cam 86 of the cam gear 85. When the projection 97 (or 97') is in contact with the projection 86a of the cam 86, the projection 97' (or 97) is in contact with or within proximity to a portion of the cam 86 opposite the projection 86a.

A depression pin 98 projects upward from a right side edge of the friction arm 93 at a substantially transversely central position thereof, as depicted in FIG. 18.

While the magnetic tape travels, the friction arm 93 is kept swinging under the condition where it is positioned at a front end of a movable range thereof, and when the magnetic tape stops travelling, the friction arm 93 is moved rearward.

Figure 28:
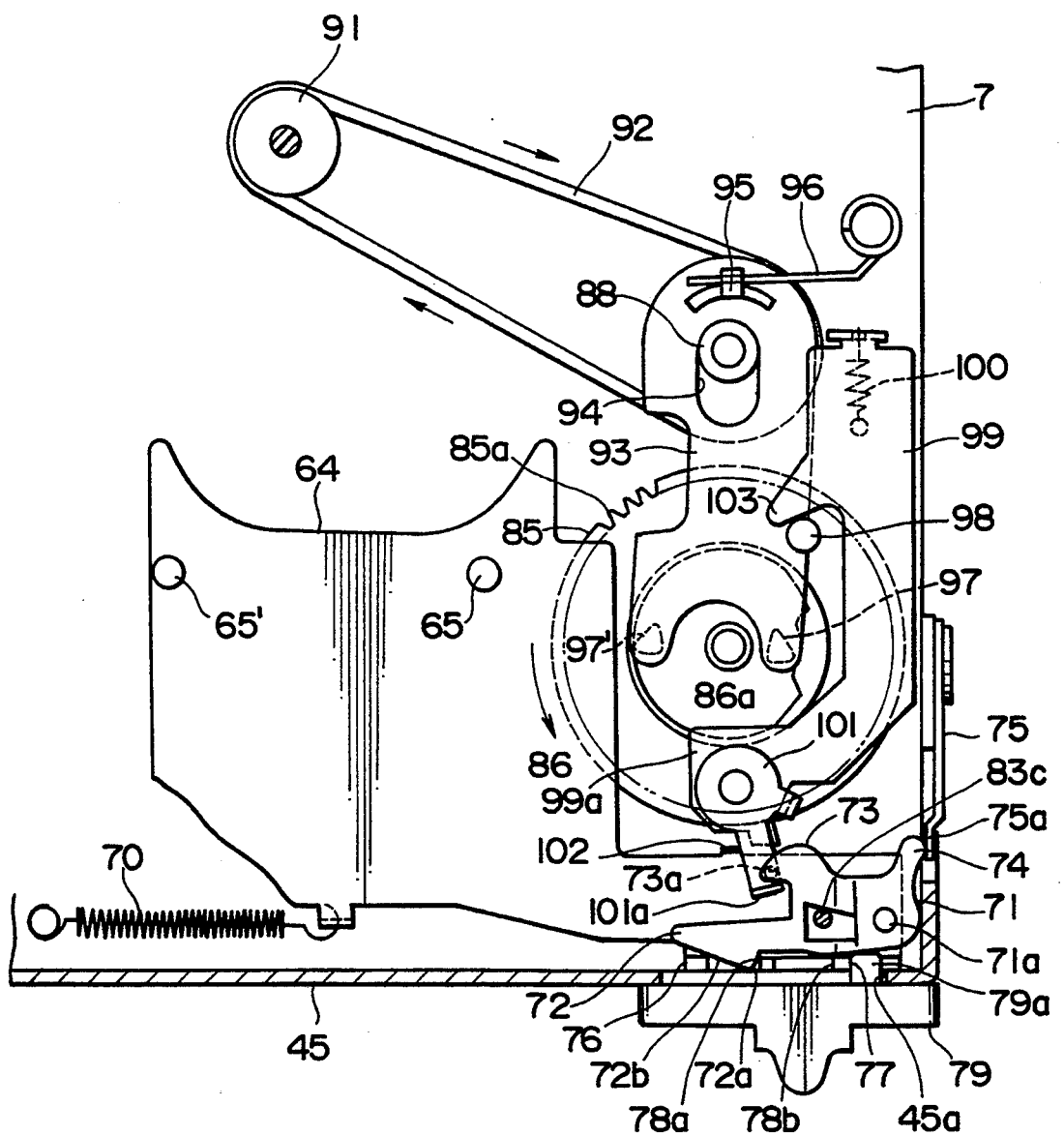
FIG. 28 is a plan view illustrating a condition of the tape end detecting mechanism in a forward playback condition.
Figure 29:
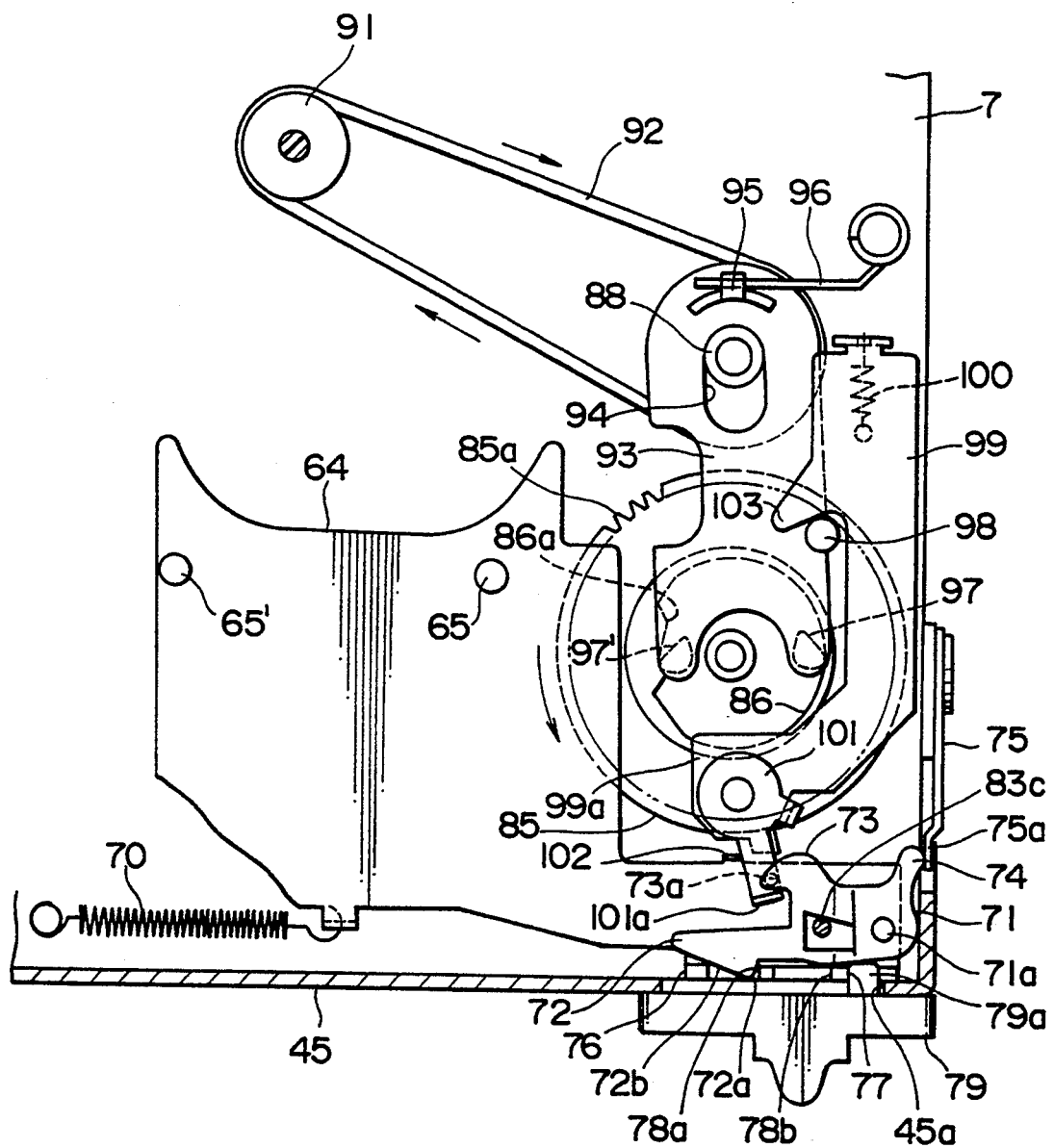
FIG. 29 is a plan view similar to FIG. 28, illustrating another condition of the tape end detecting mechanism.
Figure 30:
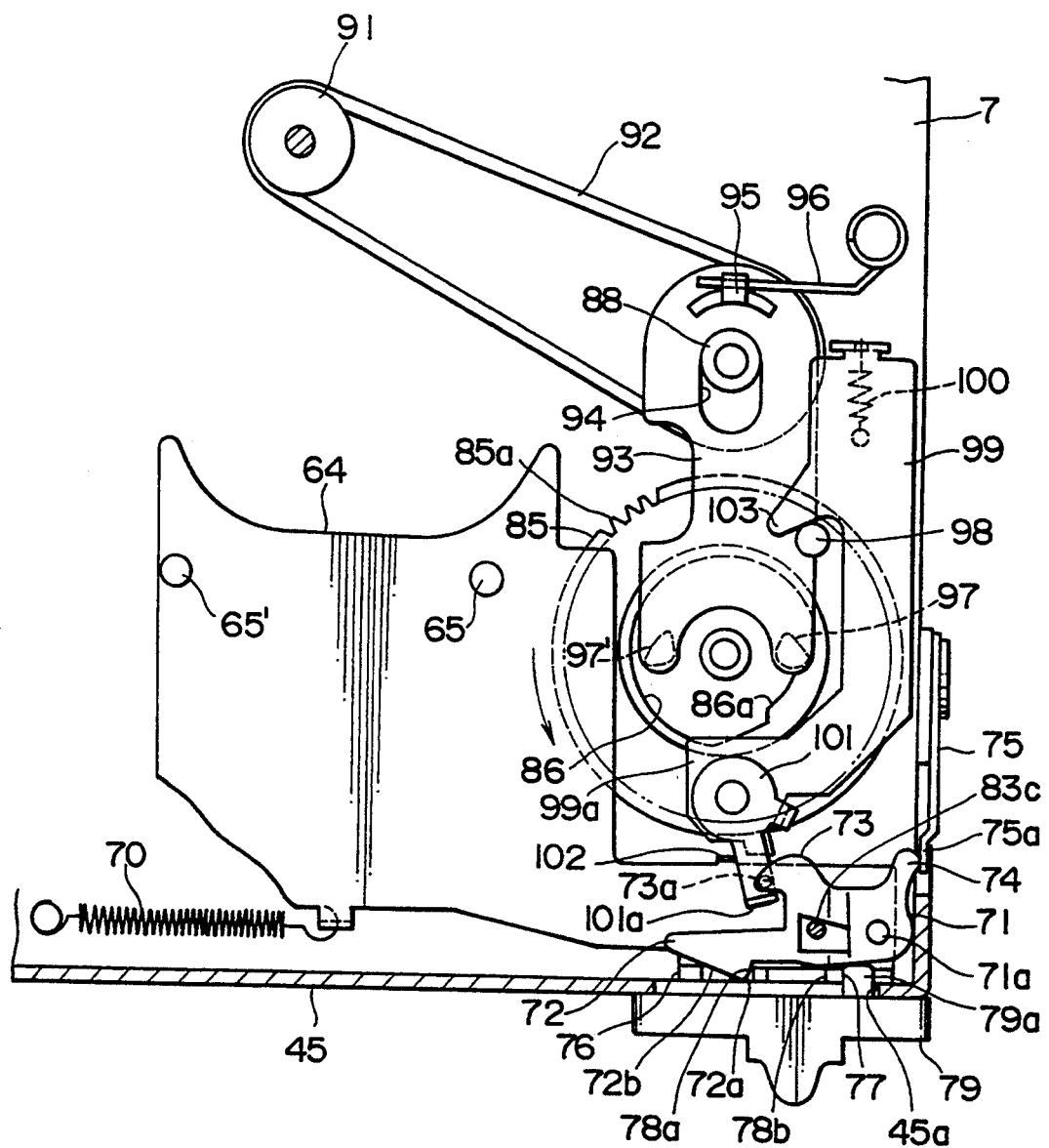
FIG. 30 is a plan view illustrating the tape end detecting mechanism when a magnetic tape stops travelling in a forward playback condition.
Figure 31:
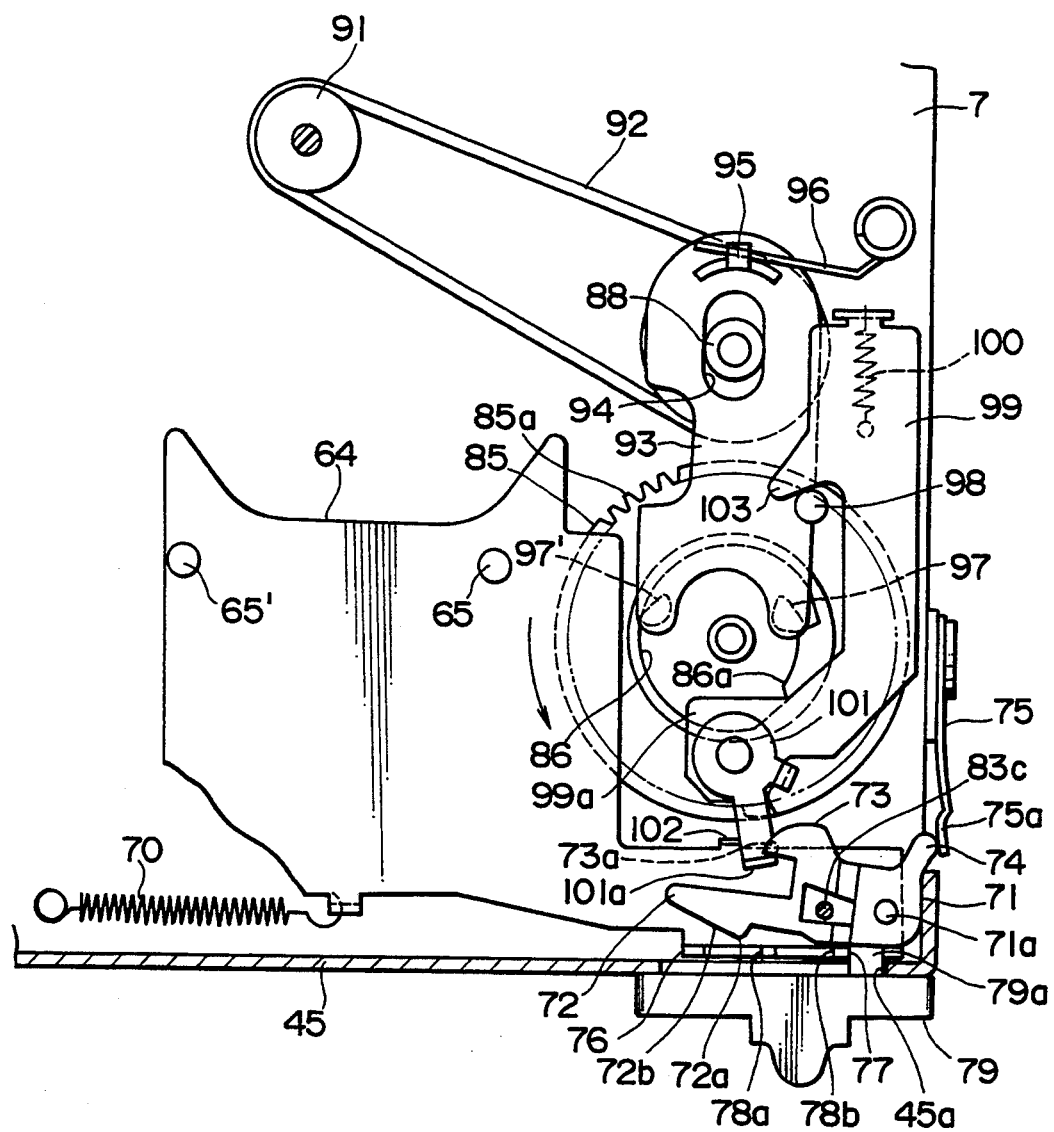
FIG. 31 is a plan view of an essential part, illustrating an operation for unlocking the direction lever at the tape end in a forward playback condition.
Figure 32:
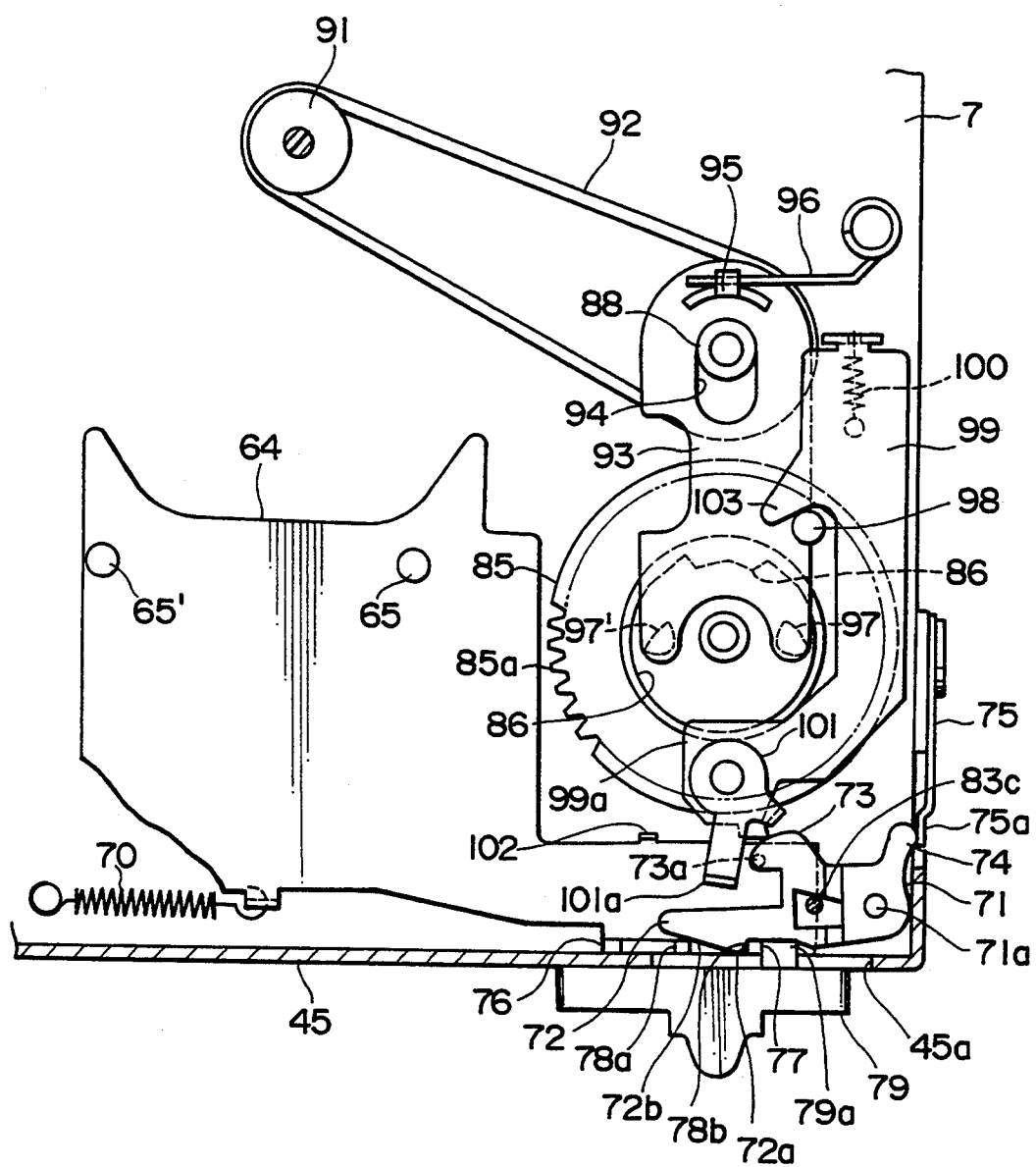
FIG. 32 is a plan view of an essential part, illustrating an operation for moving the direction lever to a reverse position at the tape end in a forward playback condition.
Figure 35:
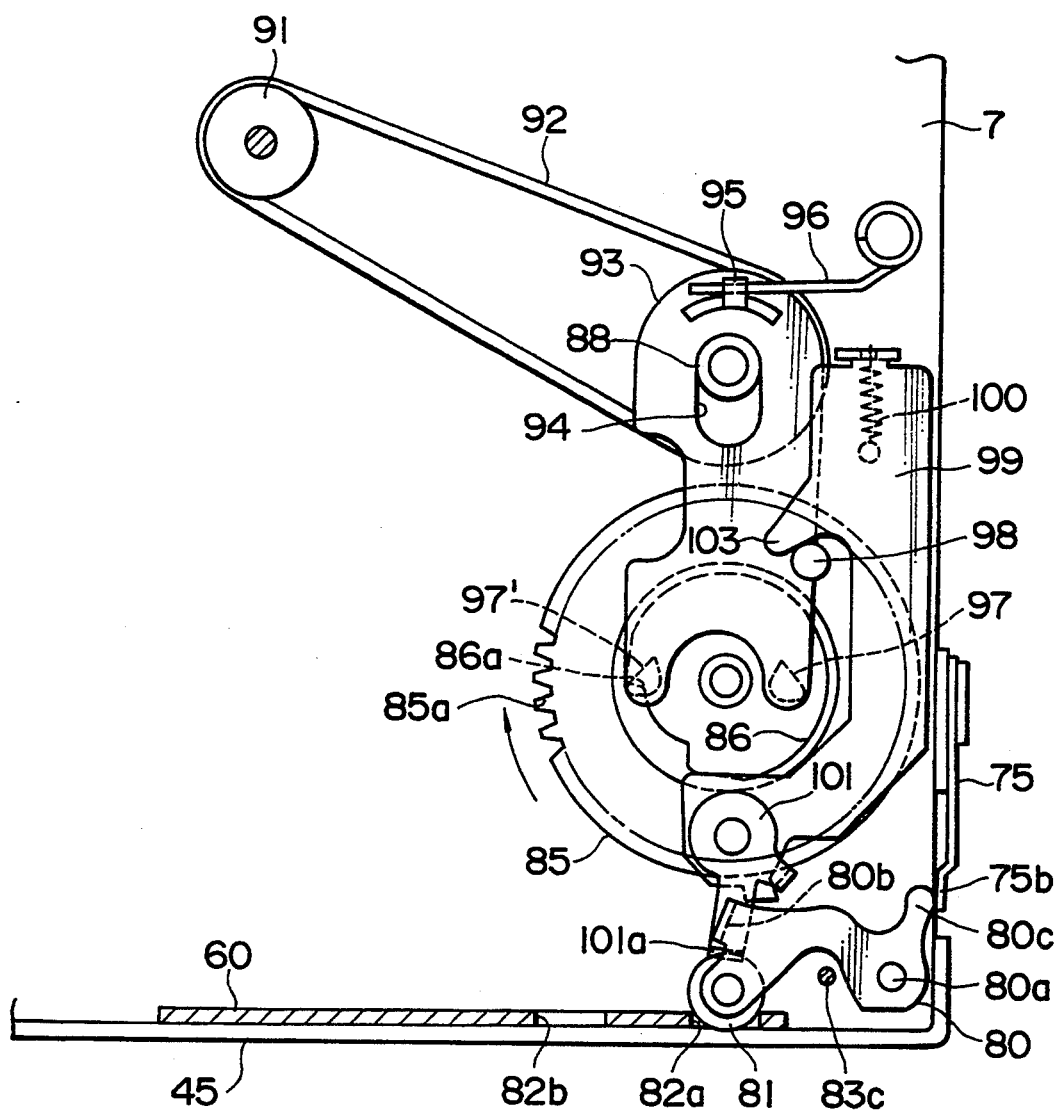
FIG. 35 is a plan view of the tape end detecting mechanism when the magnetic tape stops travelling at the tape end in a reverse playback condition.
Figure 36:
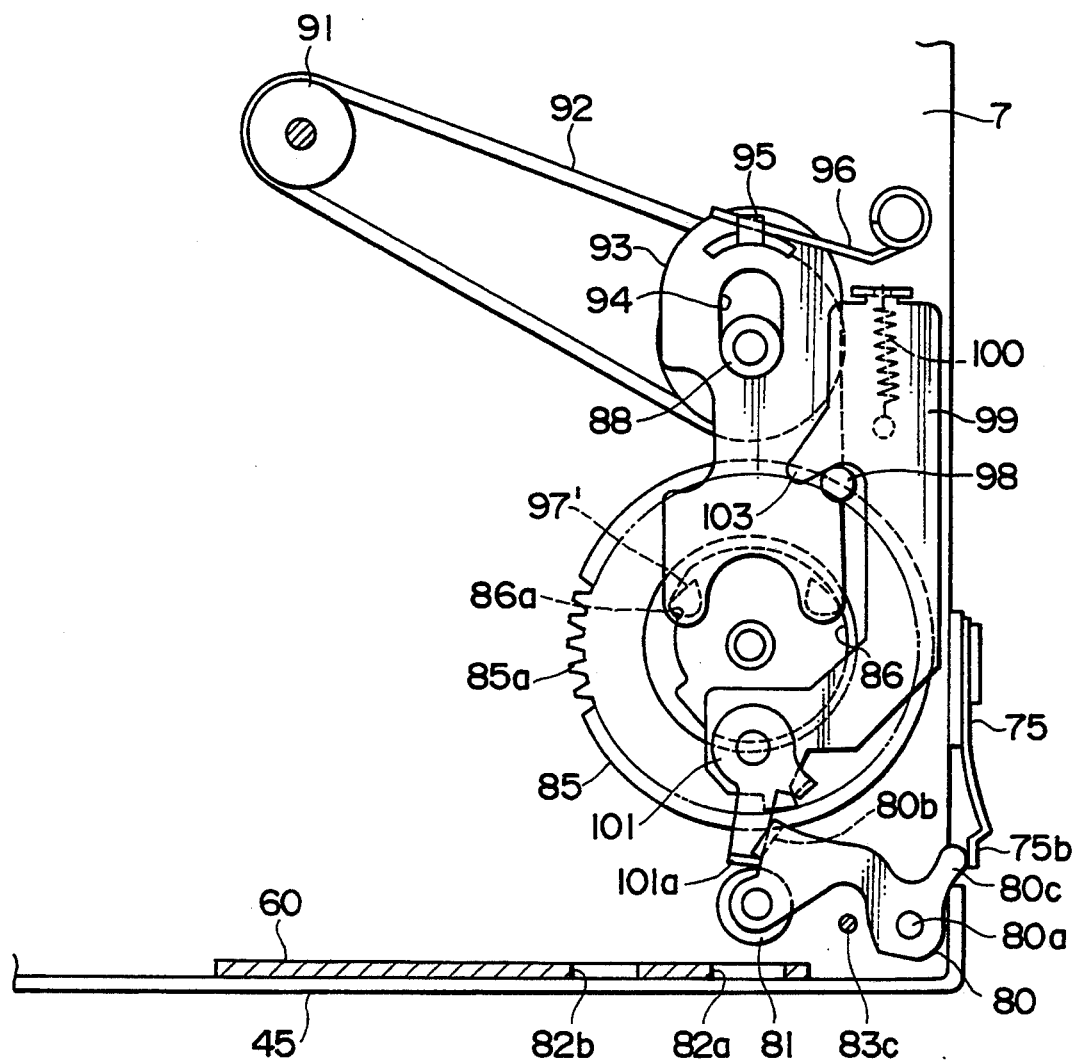
FIG. 36 is a plan view of an essential part, illustrating an operation for unlocking a mode lever at the tape end in a reverse playback condition.
Figure 37:
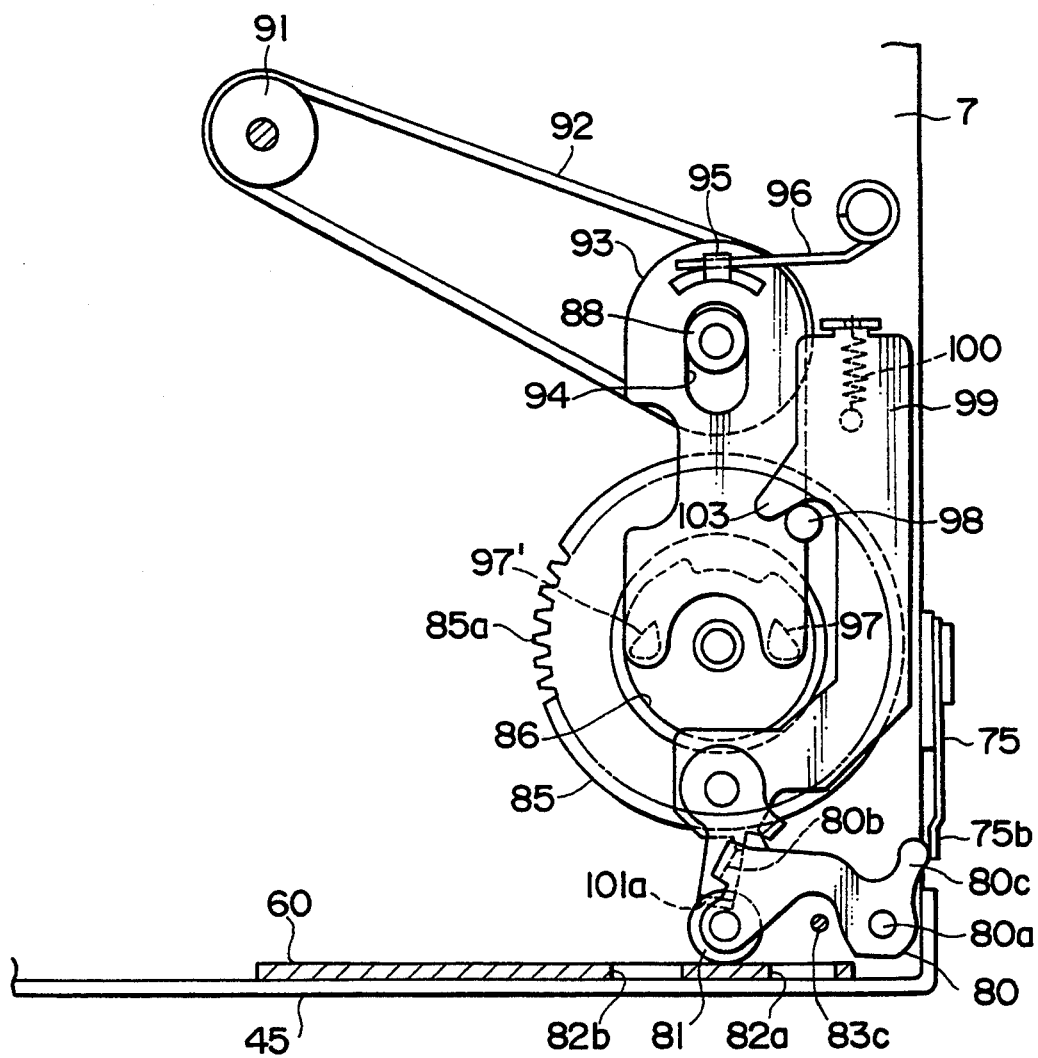
FIG. 37 is a plan view of an essential part, illustrating an automatic shut-off condition where the mode lever has been returned to a neutral position at the tape end in a reverse playback condition.

More specifically, when the magnetic tape travels in the forward direction, the counter pulley 89 is rotated in the clockwise direction, and accordingly the friction arm 93 kept in elastic contact with the counter pulley 89 by the coil spring 90 receives the clockwise torque from the counter pulley 89. Accordingly, the left projection 97' of the friction arm 93 is kept in contact with a left portion of the cam 86 of the cam gear 85, as depicted in FIG. 28. On the other hand, the cam gear 85 is rotated in the counterclockwise direction during rotation of the motor 10. Accordingly, when the projection 86a of the cam 86 comes to the position of the left projection 97', it is brought into contact with the tapered rear end of the left projection 97' to rightward urge the same, as depicted in FIG. 29. As a result, the friction arm 93 is slightly pivoted in the counterclockwise direction. Thereafter, when the projection 86a is separated from the projection 97', the friction arm 93 is pivoted in the clockwise direction by the clockwise torque received from the counter pulley 89, and the projection 97' comes again to contact with the left portion of the cam 86 other than the projection 86a. In this manner, while the magnetic tape travels in the forward direction, the friction arm 93 is kept swinging.

When the magnetic head stops travelling in the forward direction, the rotation of the counter pulley 89 is stooped, and the friction arm 93 therefore stops receiving the clockwise torque from the counter pulley 89. In this condition, the cam gear 85 continues to be rotated in the counterclockwise direction. Accordingly, when the projection 86a of the cam 86 comes to the position of the left projection 97' of the friction arm 93 to rightward urge the left projection 97', the right projection 97 is also moved rightward to come into contact with a right portion of the cam 86 other than the projection 86a and keep this position. That is, the front surface of the projection 97 comes to a position on a locus of movement of the projection 86a and keeps this position. Thereafter, when the projection 86a comes to the position of the right projection 97, the front surface of the projection 97 is brought into engagement with the projection 86a because the front surface of the projection 97 is substantially flat and it faces the projection 86a. Accordingly, the right projection 97 is urged rearward off to the left to move the friction arm 93 in the same direction as the counterclockwise rotation of the cam gear 85 proceeds. Thereafter, when the projection 86a comes to the right side of the projection 97, the engagement of the projection 97 with the projection 86a is released. As a result, the friction arm 93 is moved frontward by the resilient force of the torsion spring 96.

In contrast, when the magnetic tape travels in the reverse direction, the counter pulley 89 is rotated in the counterclockwise direction, and accordingly the friction arm 93 kept in elastic contact with the counter pulley 89 by the coil spring 90 receives the counterclockwise torque from the counter pulley 89. Accordingly, the right projection 97 of the friction arm 93 is kept in contact with a right portion of the cam 86 of the cam gear 85. On the other hand, the cam sear 85 is rotated in the clockwise direction during rotation of the motor 10. Accordingly, when the projection 86a of the cam 86 comes to the position of the right projection 97, it is brought into contact with the tapered rear end of the right projection 97 to leftward urge the same. As a result, the friction arm 93 is slightly pivoted in the clockwise direction. Thereafter, when the projection 86a is separated from the projection 97, the friction arm 93 is pivoted in the counterclockwise direction by the counterclockwise torque received from the counter pulley 89, and the projection 97 comes again to contact with the right portion of the cam 86 other than the projection 86a. In this manner, while the magnetic tape travels in the reverse direction, the friction arm 93 is kept swinging.

When the magnetic head stops travelling in the reverse direction, the rotation of the counter pulley 89 is stopped, and the friction arm 93 therefore stops receiving the counterclockwise torque from the counter pulley 89. In this condition, the cam gear 85 continues to be rotated in the clockwise direction. Accordingly, when the projection 86a of the cam 86 comes to the position of the right projection 97 of the friction arm 93 to leftward urge the right projection 97, the left projection 97' is also moved leftward to come into contact with a left portion of the cam 86 other than the projection 86a and keep this position. That is, the front surface of the projection 97' comes to a position on a locus of movement of the projection 86a and keeps this position. Thereafter, when the projection 86a comes to the position of the left projection 97', the front surface of the projection 97' is brought into engagement with the projection 86a because the front surface of the projection 97' is substantially flat and it faces the projection 86a. Accordingly, the left projection 97' is urged rearward off to the right to move the friction arm 93 in the same direction as the clockwise rotation of the cam gear 85 proceeds. Thereafter, when the projection 86a comes to the left side of the projection 97', the engagement of the projection 97' with the projection 86a is released. As a result, the friction arm 93 is moved frontward by the resilient force of the torsion spring 96.

As shown in FIG. 16, reference numeral 99 designates a transfer slider transversely movably supported to the chassis 7 at the right end portion thereof. A coil spring 100 is stretched between the transfer slider 99 and the chassis 7, so as to normally frontward bias the transfer slider 99.

A front end portion 99a of the transfer slider 99 projects leftward, and a drawing arm 101 is pivotably supported on the front end portion 99a so as to be pivotable in a given angular range. The drawing arm 101 is formed at its front end with a drawing portion 101a projecting upward. The drawing arm 101 is pivotable between an automatic shut-off stand-by position where the drawing portion 101a is located on the front side of the projection 80b of the mode lock member 80 and an automatic reverse stand-by position where the drawing portion 101a is located on the front side of the projection 73a of the direction lock member 71. The drawing arm 101 is normally biased in the clockwise direction by spring means (not shown).

A restricting projection 102 is formed at the rear edge of the right portion of the direction lever 64 so as to project upward. When the direction lever 64 is in any position other than the forward position, the restricting projection 102 is located on the left side of the drawing arm 101 in spaced relationship therefrom. In this condition, the drawing arm 101 is located in the automatic shut-off stand-by position mentioned above. Further, when the direction lever 64 is moved to the forward position, the restricting projection 102 rightward urges the drawing arm 101 to pivot the same in the counterclockwise direction to the automatic reverse stand-by position mentioned above.

A depressed projection 103 is formed on a left side edge of the transfer slider 99 at a substantially central portion thereof so as to project frontward off to the left. The depressed projection 103 of the transfer slider 99 is located on a locus of movement of the depression pin 98 of the friction arm 93. That is, when the transfer slider 99 is positioned at a front end of a movable range thereof, the depressed projection 103 is located just behind the depression pin 98 in the condition where the friction arm 93 is positioned at a front end of a movable range thereof.

The automatic reverse operation or the automatic shut-off operation at the tape end is carried out as follows:

When the magnetic tape is fully supplied from the supply tape reel during forward travelling of the magnetic tape to reach the tape end, the play gear 25' meshing with the large gear 9'a of the T-side reel bed 8' stops rotating. Accordingly, the relay gear 26 meshing with the play gear 25' stops rotating to stop transmission of the clockwise torque applied to the friction arm 93.

On the other hand, there occurs slip between the limiter gear 17 and the intermediate gear 16 through the torque limiter 19, so that the motor 10 continues to rotate. Accordingly, the cam gear 85 continues to be rotated in the counterclockwise direction.

Accordingly, as mentioned previously, the friction arm 93 is moved rearward in association with the rotation of the cam gear 85, and the depression pin 98 of the friction arm 93 rearward urges the depressed projection 103 of the transfer slider 99. Accordingly, the transfer slider 99 is moved rearward against a tensile force of the coil spring 100, and the drawing arm 101 connected to the front end portion 99a of the transfer arm 99 is also moved rearward.

As mentioned previously, when the magnetic tape travels in the forward direction, the drawing arm 101 is pivoted in the counterclockwise direction by the restricting projection 102 to keep the automatic reverse stand-by position where the drawing portion 101a is located on the front side of the projection 73a of the direction lock member 71. Accordingly, when the drawing arm 101 is moved rearward as mentioned above, the drawing portion 101a of the drawing arm 101 rearward draws the projection 73a of the direction lock member 71. Accordingly, the direction lock member 71 is pivoted in the clockwise direction against the resilient force of the elastic arm 75a of the leaf spring 75, and the pawl 72a of the direction lock member 71 is therefore disengaged from the recess 78a of the direction lever 64. At the same time, the knob lock member 83 is also pivoted in the counterclockwise direction in association with the counterclockwise pivotal movement of the direction lock member 71. As a result, the direction knob 79 in the forward position is unlocked, and the direction lever 64 in the forward position is unlocked, so that the direction lever 64 is moved to the reverse position by the tensile force of the tension spring 70.

When the direction lever 64 is thus moved to reach the reverse position, the slide pin 67a engaged with the recess 68a of the direction lever 64 is moved to the reverse position to change the rotational direction of the motor 10. Further, the right head lever 55 is returned to its inoperative position, that is, to the front position, and simultaneously the left head lever 56 is moved to its operative position, that is, to the rear position. Accordingly, the take-up arm 22 is pivoted in the clockwise direction to bring the play gear 25 into mesh with the large gear 9a of the S-side reel bed 8. Thus, the magnetic tape starts travelling in the reverse direction.

Substantially simultaneously with the above automatic reverse operation, the friction arm 93 and the transfer slider 99 are returned to the front position.

Thereafter, when the magnetic tape is fully supplied from the tape reel engaged with the S-side reel bed 8 in the reverse travelling to reach the tape end, the friction arm 93 is moved rearward in association with the rotation of the cam gear 85, and the depression pin 98 of the friction arm 93 therefore urges the depressed projection 103 of the transfer slider 99. Accordingly, the transfer slider 99 is moved rearward against the tensile force of the coil spring 100, and the drawing arm 101 connected to the rear end portion 99a of the transfer slider 99 is also moved rearward.

As mentioned previously, when the magnetic tape travels in the reverse direction, the drawing arm 101 is pivoted in the clockwise direction by the spring means not shown to keep the automatic shut-off stand-by position where the drawing portion 101a is located on the front side of the projection 80b of the mode lock member 80. Accordingly, when the drawing arm 101 is moved rearward as mentioned above, the drawing portion 101a of the drawing arm 101 rearward draws the projection 80b of the mode lock member 80. Accordingly, the mode lock member 80 is pivoted in the clockwise direction against the resilient force of the elastic arm 75b of the leaf spring 75, and the roller 81 of the mode lock member 80 is therefore disengaged from the hole 82a or 82b of the mode lever 60. As a result, the mode lever 60 is returned to the neutral position by the resilient force of the centering spring 63. Accordingly, the head lever 56 is returned to its inoperative position, and the motor 10 stops rotating.

Thereafter, the direction lever 64 may be returned to the forward position by a suitable mechanism such as a mechanism interlocking with unloading operation of the tape cassette from the cassette loading recess 5.

It is to be understood that the specific shapes and the structures shown in the above preferred embodiment are merely illustrative and the present invention is not limited to the above preferred embodiment. In particular, the direction locking means and the tape end detecting means are not limited to those shown in the above preferred embodiment, but it is only necessary to detect the tape end in the forward mode and then unlock the direction locking means.

What is claimed is:

1. A tape recorder comprising:
   a housing;
   a chassis mounted on said housing;
   a limiter gear mechanism supported on said chassis having a torque limiter;
   driving means for rotationally driving said limiter gear mechanism in one of a forward or a reverse direction;
   a pair of reel beds supported on said chassis;
   a pair of reel bed gears attached to said pair of reel beds;
   a swing lever swingably provided between said pair of reel bed gears, said swing lever having a gear train rotated by said limiter gear mechanism and also having a depressed portion;

a magnetic head supporting member supported on said chassis for supporting a pair of magnetic heads selectively operated according to a tape travelling direction of a tape contained in a tape cassette inserted in said housing;

means for moving said magnetic head supporting member so as to selectively move one of said magnetic heads between an operative position where said one of said magnetic heads is in contact with said tape and an inoperative position where said one of said magnetic heads is in separation from said tape;

direction selecting means supported on said chassis for selecting said tape travelling direction and controlling movement of said magnetic head supporting member so as to selectively restrict movement of another of said magnetic heads to said operative position; and a mode lever supported on said chassis and movable among a neutral position, a record position and a playback position, said mode lever biasing said magnetic head supporting member to said operative position of said one of said magnetic heads when said mode lever is moved to said record position or said playback position;

whereby when said magnetic head supporting member is biased by said mode lever to move said one of said magnetic heads to said operative position according to said tape travelling direction selected by said direction selecting means, said magnetic head supporting member urges said depressed portion of said swing lever to swing said swing lever and bring said gear train into mesh with one of said reel bed gears according to said tape travelling direction.

2. The tape recorder as defined in claim 1, wherein said limiter gear mechanism comprises:
a first gear meshing with said gear train;
a second gear arranged coaxially with said first gear and rotated by said driving means; and
a friction member interposed between said first gear and said second gear.

3. The tape recorder as defined in claim 1, wherein said direction selecting means comprises a direction lever movable among a neutral position, a forward position and a reverse position, said direction lever restricting the movement of said magnetic head supporting member so as to hinder the movement of one of said magnetic heads to said operative position when said direction lever is in said forward position, and hinder the movement of said other magnetic head to said operative position when said direction lever is in said reverse position.

4. The tape recorder as defined in claim 1, wherein said magnetic head supporting member comprises a pair of head arms on which said magnetic heads are respectively mounted, each of said head arms having a depressing portion for depressing said depressed portion of said swing lever;
whereby when one of said head arms is biased by said mode lever to move the corresponding magnetic head to said operative position according to said tape travelling direction selected by said direction selecting means, said one of said head arms urges said depressed portion of said swing lever to swing said swing lever and bring said gear train into mesh with one of said reel bed gears according to said tape travelling direction.

5. A tape recorder comprising:
a housing;
a chassis mounted on said housing;
a pair of head arms supported on said chassis each having a magnetic head thereon, each of said head arms being movable between an operative position where a corresponding magnetic head is in contact with a magnetic tape and an inoperative position where a corresponding magnetic head is separated from said tape, wherein one of said magnetic heads is movable to said operative position when said magnetic tape is travelling at a constant speed in a forward direction, and another one of said magnetic heads is movable to said operative position when said magnetic tape is travelling at a constant speed in a reverse direction;
a direction lever supported on said chassis and movable among a neutral position, a forward position and a reverse position, said direction lever hindering movement of one of said head arms to said operative position when said direction lever is in said forward position, and hindering movement of another head arm to said operative position when said direction lever is in said reverse position;
resilient means attached to said chassis and to said direction lever for resiliently biasing said direction lever to said reverse position; and
a mode lever supported on said chassis and movable among a neutral position, a record position and a playback position, said mode lever biasing one of said head arms to said operative position when said mode lever is in said record position or said playback position;
whereby when said mode lever is moved to one of said record position and said playback position under the condition where said direction lever is in one of said forward position and said reverse position, one of said head arms is selectively moved to said operative position.

6. The tape recorder as defined in claim 5 further comprising a link member for linking said head arms together, said link member having a portion to be biased by said mode lever.

7. A tape recorder comprising:
a housing;
a chassis mounted on said housing;
a pair of reel beds supported on said chassis;
a direction lever supported on said chassis and slidable between a first position where a forward mode is established and a second position where a reverse mode is established, in which mode a tape inserted in said housing is moved in a direction reverse to a travelling direction of said tape in said forward mode;
resilient means attached to said chassis and to said direction lever for resiliently biasing said direction lever to said second position;
direction lever locking means supported on said chassis for locking said direction lever in said first position; and
tape end detecting means supported on said chassis for unlocking said direction lever locked by said direction lever locking means at the end of said tape which is travelling in said forward mode, wherein said tape end detecting means comprises
a first unlocking member which receives a torque of one of said reel beds in a forward or a reverse direction through a friction mechanism and is pivoted according to a rotational direction of said one reel bed, said first unlocking member being linearly movable;

first biasing means for biasing said first unlocking member in a first direction;

a second unlocking member linearly movable;

second biasing means for biasing said second unlocking member in a second direction, wherein when said first unlocking member is moved in a third direction said second unlocking member is moved in a fourth direction; and a cam gear receiving a torque of a motor in a forward or a reverse direction and rotatable according to the rotational direction of said motor;

wherein when said one reel bed is in rotation, said cam gear intermittently pivots said first unlocking member in a direction reverse to that of said torque received, while when said one reel bed stops rotating, said cam gear moves said first unlocking member in said third direction, thereby moving said second unlocking member in said fourth direction to function as a trigger at the tape end.

8. The tape recorder as defined in claim 7 further comprising:

a mode lever slidable between a third position where a record mode is established and a fourth position where a playback mode is established; wherein said direction lever locking means comprises a direction lock member movable to a lock position where movement of said direction lever is inhibited when said mode lever is in said third position, and movable to an unlock position where the movement of said direction lever is permitted when said mode lever is in a position other than said third position; and a direction unlocking mechanism for moving said direction lock member to said unlock position at a tape end in said record mode.

9. A tape recorder comprising:

a housing;

a chassis mounted on said housing;

a pair of reel beds supported on said chassis, one of said reel beds being a take-up reel bed and another of said reel beds being a supply reel bed;

a pair of take-up and supply reel bed gears attached to said reel beds;

a play gear supported on said chassis selectively meshing one of said take-up and said supply reel bed gears;

a limiter gear supported for association with said play gear;

an intermediate gear arranged coaxially with said limiter gear and rotated by a driving source;

a torque limiter interposed between said limiter gear and said intermediate gear; and a high-speed mode select slider for supporting said intermediate gear and said limiter gear, said high-speed mode select slider being slidable among a neutral position where said intermediate gear meshes neither said take-up reel bed gear nor said supply reel bed gear, a fast forward position where said intermediate gear meshes said take-up reel bed gear, and a rewind position where said intermediate gear meshes said supply reel bed gear;

whereby when said high-speed mode select slider is slid to said fast forward position or said rewind position, said intermediate gear is selectively meshed with one of said take-up reel bed gear and said supply reel bed gear.

10. The tape recorder as defined in claim 9 further comprising:

a swing lever located between said take-up reel bed gear and said supply reel bed gear for supporting said play gear, said swing lever being swingable among a forward position where said play gear meshes said take-up reel bed gear, a reverse position where said play gear meshes said supply reel bed gear, and a neutral position where said play gear meshes neither said take-up reel bed gear nor said supply reel bed gear; and a restricting member for restricting a swing motion of said swing lever, said restricting member being movable in association with a slide motion of said high-speed mode select slider, wherein when said high-speed mode select slider is in said fast forward position or said rewind position, said swing lever is restricted by said restricting member to keep said neutral position.

* * * * *